United States Patent
Yusuf et al.

(10) Patent No.: US 12,265,972 B2
(45) Date of Patent: Apr. 1, 2025

(54) METHODS AND SYSTEMS FOR CONCIERGE NETWORK

(71) Applicant: Capital One Services, LLC, McLean, VA (US)

(72) Inventors: Muhammad Ziauddin Yusuf, London (GB); Alexander MacDonald, London (GB); Sune Westphalen, London (GB); Dylan Plofker, New York, NY (US)

(73) Assignee: Capital One Services, LLC, McLean, VA (US)

(*) Notice: Subject to any disclaimer, the term of this patent is extended or adjusted under 35 U.S.C. 154(b) by 255 days.

(21) Appl. No.: 17/823,623

(22) Filed: Aug. 31, 2022

(65) Prior Publication Data
US 2023/0036167 A1 Feb. 2, 2023

Related U.S. Application Data

(63) Continuation of application No. PCT/GB2021/050596, filed on Mar. 10, 2021.

(60) Provisional application No. 62/987,822, filed on Mar. 10, 2020.

(51) Int. Cl.
G06Q 30/00 (2023.01)
G06Q 30/016 (2023.01)
G06Q 30/0203 (2023.01)

(52) U.S. Cl.
CPC ....... *G06Q 30/016* (2013.01); *G06Q 30/0203* (2013.01)

(58) Field of Classification Search
None
See application file for complete search history.

(56) References Cited

U.S. PATENT DOCUMENTS

| | | | |
|---|---|---|---|
| 9,489,625 B2* | 11/2016 | Kalns | G06N 5/02 |
| 10,325,211 B2 | 6/2019 | Sanchez et al. | |
| 10,445,655 B2 | 10/2019 | Sanchez et al. | |
| 11,080,721 B2* | 8/2021 | Kannan | G06Q 30/02 |

(Continued)

FOREIGN PATENT DOCUMENTS

| | | | |
|---|---|---|---|
| EP | 3557504 A1 | 10/2019 | |
| WO | WO-2021181095 A1 | 9/2021 | |

OTHER PUBLICATIONS

Dagar, Mohannad AM Abu, and Ahmad KA Smoudy. "The role of artificial intelligence on enhancing customer experience." International Review of Management and Marketing 9.4 (2019): 22. (Year: 2019).*

(Continued)

*Primary Examiner* — Gurkanwaljit Singh
(74) *Attorney, Agent, or Firm* — Foley & Lardner LLP

(57) ABSTRACT

The present disclosure provides a concierge network. The concierge network comprises a server in communication with a plurality of user devices over a network, and the server is configured to: generate one or more proposals based on request data using a machine learning algorithm trained model; receive a user input for modifying one or more fields of the one or more proposals via a first graphical user interface, in which at least one of the one or more fields includes insight data extracted from feedback data received from a second graphical user interface; and output at least one of the one or more modified proposals for display on the second graphical user interface.

20 Claims, 29 Drawing Sheets

(56) References Cited

U.S. PATENT DOCUMENTS

| | | | |
|---|---|---|---|
| 11,580,179 B2* | 2/2023 | Xiu | G06F 16/338 |
| 2012/0076283 A1* | 3/2012 | Ajmera | H04M 3/5183 |
| | | | 379/93.17 |
| 2013/0282430 A1* | 10/2013 | Kannan | G06Q 30/02 |
| | | | 705/7.29 |
| 2016/0371798 A1 | 12/2016 | Ghahramani | |
| 2018/0053119 A1 | 2/2018 | Zeng et al. | |
| 2018/0054464 A1 | 2/2018 | Zhang et al. | |
| 2018/0054523 A1 | 2/2018 | Zhang et al. | |
| 2019/0324780 A1 | 10/2019 | Zhu et al. | |
| 2020/0074311 A1 | 3/2020 | Li et al. | |
| 2020/0097608 A1* | 3/2020 | Xiu | G06F 16/35 |
| 2020/0327444 A1* | 10/2020 | Negi | G06Q 30/0281 |
| 2021/0166322 A1* | 6/2021 | Allen | G06Q 40/08 |
| 2021/0201327 A1* | 7/2021 | Konig | H04M 3/5191 |
| 2021/0203784 A1* | 7/2021 | Konig | G06Q 30/01 |

OTHER PUBLICATIONS

Karat, Clare-Marie, et al. "Personalizing the user experience on ibm. com." IBM Systems Journal 42.4 (2003): 686-701. (Year: 2003).*

Patel, Nikhil, and Sandeep Trivedi. "Leveraging predictive modeling, machine learning personalization, NLP customer support, and AI chatbots to increase customer loyalty." Empirical Quests for Management Essences 3.3 (2020): 1-24. (Year: 2020).*

PCT/GB2021/050596 International Search Report & Written Opinion dated Jul. 2, 2021.

* cited by examiner

METHODS AND SYSTEMS FOR CONCIERGE NETWORK

CROSS-REFERENCE

This application is a Continuation application of International Application No. PCT/GB2021/050596, filed Mar. 10, 2021, which claims priority to U.S. Provisional Patent Application No. 62/987,822, filed Mar. 10, 2020, which is entirely incorporated herein by reference.

BACKGROUND

Digital assistants or virtual assistants can perform requested tasks and provide requested advice, information, or services. An assistant's ability to fulfill a user's request is dependent on the assistant's correct comprehension of the request or instructions. Recent advances in natural language processing have enabled users to interact with digital assistants using natural language, in spoken or textual forms such as chat bot. Such digital assistant system may perform concierge-type services (e.g., making dinner reservations, purchasing event tickets, making travel arrangements) or provide information based on the user input. The assistant system may also perform management or data-handling tasks based on online information and events without user initiation or interaction. However, in order for the digital assistant to generate a satisfactory result, it usually requires the user to provide query type input specifying pre-determined search terms. The ability of a digital assistant system to produce satisfactory responses to user requests may be limited by the natural language processing, knowledge base, and input information provided by a user. Therefore, a need exists for a concierge platform with improved customer experience.

SUMMARY

Aspects of the invention are as set out in the appended independent claims, and optional features in the dependent claims.

Current virtual assistant or digital assistant systems may not be able to provide satisfactory user experience as a customer is usually requested to provide detailed inputs such as location, date, time, restaurant name, so that a digital assistant perform the search. The present disclosure provides a concierge network addressing the above needs by leveraging human agents knowledge, machine learning-based auto-processing and insight extraction. In particular, the concierge network provides an assistant and responder system including recommendation and transaction machines for assisting human agents to provide concierge-type services in an optimized workflow. The workflow may beneficially improve the efficiency for providing concierge-type services by determining the optimal data/information to be provided to the human agent and when to present such information. The workflow may begin with receiving minimal input from a customer all the way through booking and fulfillment of the request in an optimized pipeline.

The present disclosure provides systems and methods for providing deep learning-based recommendations to human agents, leveraging human agents' knowledge and implicit insight of customer preferences to provide personalized experience to customers. Moreover, the provided system allows for live communication experience with customers, and offers recommendations, booking, transaction, and fulfillment through an integrated platform with improved efficiency and improved performance.

In an aspect, a system for generating service proposals is provided. The system comprises: a server in communication with a plurality of user devices over a network, and the server comprises: a memory for storing a set of software instructions, and one or more processors configured to execute the set of software instructions to: (a) generate, using a first machine learning algorithm trained model, one or more proposals based on request data related to a service request; (b) receive a user input for modifying one or more fields of the one or more proposals via a first graphical user interface, that at least one of the one or more fields includes insight data extracted by processing feedback data received from a second graphical user interface; and (c) output at least one of the one or more modified proposals for display on the second graphical user interface.

In some embodiments, the request data comprises request data points extracted from a customer input for the service request. In some cases, the request data points comprise a type of the service request, time or location of the service. In some cases, the one or more processors are configured to further match the service request with a user, based at least in part on the request data points, for modifying the one or more fields of the one or more proposals. In some cases, the one or more processors are configured to further generate availability information based on inventory data and the request data points. In some instances, the inventory data are obtained through one or more Application Programming Interface (API) integration points. In some instances, the availability information and the extracted request data points are used to generate input feature data to be processed by the first machine learning algorithm trained model.

In some embodiments, the input feature data further comprise insight data extracted from a feedback survey personalized to a customer. In some cases, the feedback survey is displayed on the second graphical user interface. In some instances, the feedback survey is personalized using a second machine learning algorithm trained model.

In some embodiments, the one or more fields comprise one or more objective fields arranged in a hierarchical structure. In some embodiments, the one or more processors are configured to further track a fulfillment of the service request through an API integration point with a service supplier. In some cases, the feedback data comprises feedback from the service supplier.

In a related yet separate aspect, a computer-implemented method for generating service proposals is provided. The method comprises: generating, using a first machine learning algorithm trained model, one or more proposals based on request data related to a service request; receiving a user input for modifying one or more fields of the one or more proposals via a first graphical user interface, wherein at least one of the one or more fields includes insight data extracted by processing feedback data received from a second graphical user interface; and outputting at least one of the one or more modified proposals for display on the second graphical user interface.

In some embodiments, the request data comprises request data points extracted from a customer input for the service request. In some cases, the request data points comprise a type of the service request, time or location of the service. In some cases, the method further comprises matching the service request with a user, based at least in part on the request data points, for modifying the one or more fields of the one or more proposals. In some cases, the method further comprises generating availability information based on inventory data and the request data points. In some instances, the inventory data are obtained through one or more API integration points. In some instances, the availability information and the extracted request data points are used to generate input feature data to be processed by the first machine learning algorithm trained model.

In some embodiments, the input feature data further comprise insight data extracted from a feedback survey personalized to a customer. In some cases, the feedback survey is displayed on the second graphical user interface. In some instances, the feedback survey is personalized using a second machine learning algorithm trained model.

In some embodiments, the one or more fields comprise one or more objective fields arranged in a hierarchical structure. In some embodiments, the method further comprises tracking a fulfillment of the service request through an API integration point with a service supplier. In some cases, the feedback data comprises feedback from the service supplier.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein) of which:

FIGS. 7-13 show various examples of agent responder user interfaces provided by the agent responder system;

FIGS. 14-16A show various examples of customer user interfaces;

FIGS. 17-22 show various examples of agent responder user interfaces for managing the tasks and workflow for one or more tickets or requests.

DETAILED DESCRIPTION

Figure 1:
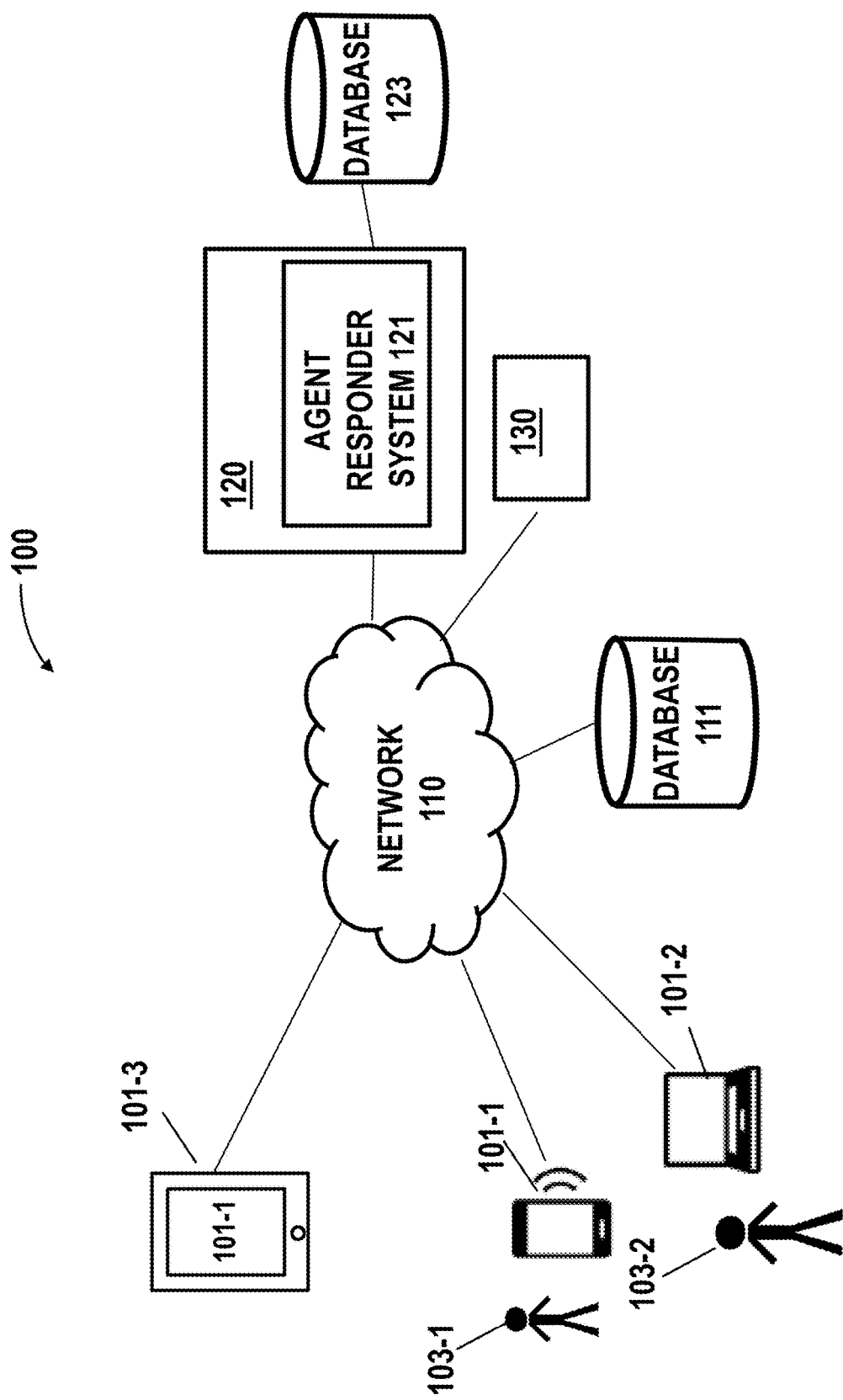
FIG. 1 schematically shows a concierge network in which the method and system for assisting agents to provide personalized services can be implemented.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Current virtual assistant or digital assistant systems may not be able to provide satisfactory user experience as a customer is usually requested to provide detailed inputs such as location, date, time, restaurant name, so that a digital assistant perform the search. The present disclosure provides a concierge network addressing the above needs by leveraging human agents knowledge, machine learning-based auto-processing and insight extraction. In particular, the concierge network provides an assistant and responder system including recommendation and transaction machines for assisting human agents to provide concierge-type services in an optimized workflow. The workflow may beneficially improve the efficiency for providing concierge-type services by determining the optimal data/information to be provided to the human agent and when to present such information. The workflow may begin with receiving minimal input from a customer all the way through booking and fulfillment of the request in an optimized pipeline.

The present disclosure provides systems and methods for providing deep learning-based recommendations to human agents, leveraging human agents' knowledge and implicit insight of customer preferences to provide personalized experience to customers. Moreover, the provided system allows for live communication experience with customers, and offers recommendations, booking, transaction, and fulfillment through an integrated platform in a convenient manner.

Additionally, personalized services can be generated based on limited customer input that may not be sufficient for a conventional digital assistant system. For example, systems and methods of the present disclosure may be used or configured to predict an intent (e.g., destination of a trip, travel plan) based on limited input data from users (e.g., concierge-type input such as "recommendation for a local event"). The provided systems and methods may automatically generate personalized recommendations to human agents, assisting the human agents to further customize the recommendations by leveraging special knowledge and resources thereby providing an improved experience to customers. The provided systems and methods may allow for a range of use cases in industries such as hotels and hospitality, restaurants and dining, tourism and entertainment, healthcare, service delivery, and various others.

A user of the provided system may be an individual human agent, or the user may be an entity (e.g., business, travel organization, etc.), a group of human agents who are responding to and fulfilling customer requests to provide concierge-type services (e.g., making dinner reservations, purchasing event tickets, making travel arrangements etc.) and highly personalized services tailored (e.g., favorite seat in a restaurant, temperature in a hotel room, special local events such as swim with orca whales, etc.). A user of the provided concierge network or platform may also include individual customers who seek of personalized services such as travel, dining, concerts, trips, activities, events tailored to the customer that the personalized service may not be readily available or easily accessed by performing a search.

In some embodiments, the provided system may have intent prediction capability that can be utilized to personalize the service with limited customer input. For instance, the predicted customer intent may be used to personalize a transportation experience (e.g., music streaming service during transportation, trip intermittently stop, such as at restaurants, coffee shops, etc.) or activities performed at the destination.

The provided systems may employ artificial intelligence techniques to analyze customer request to extract data points, triage the requests based on the extracted data points, generate recommended proposals with editable fields and insight data extracted from customer feedback, and guide human assistant to customize the recommended proposals in an optimized flow. In some cases, personalized feedback survey may also be generated using artificial intelligence techniques. Artificial intelligence, including machine learning algorithms, may be used to train a predictive model for predicting a customer intent, generating customizable proposals and/or personalized survey, and various other functionalities as described above. A machine learning algorithm may be a neural network, for example. Examples of neural networks that may be used with embodiments herein may include a deep neural network, convolutional neural network (CNN), and recurrent neural network (RNN). In some cases, a machine learning algorithm trained model may be pre-trained and implemented on the provided agent responder system, and the pre-trained model may undergo continual re-training that may involve continual tuning of the predictive model or a component of the predictive model (e.g., classifier) to adapt to changes in the implementation environment over time (e.g., changes in the customer/user data, insight data, model performance, third-party data, etc.).

The term "labeled data" or "labeled dataset," as used herein, generally refers to a paired dataset used for training a model using supervised learning. The labeled data may be generated by expert or using insight extracted from customer/service supplier feedback data. In some cases, methods provided herein may utilize customer intent extracted by clustering analysis as part of the labeled dataset. Alternatively, methods provided herein may utilize an un-paired training approach allowing a machine learning method to train and apply on existing datasets that may be available with an existing system.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The terms "a," "an," and "the," as used herein, generally refers to singular and plural references unless the context clearly dictates otherwise.

FIG. 1 schematically shows a concierge network or platform 100 in which the method and system for assisting agents to provide personalized services can be implemented. A platform 100 may include one or more user devices 101-1, 101-2, 101-3, a server 120, an agent responder system 121, one or more third-party systems 130, and a database 111, 123. Each of the components 101-1, 101-2, 101-3, 111, 123, 120, 130 may be operatively connected to one another via a network 110 or any type of communication link that allows transmission of data from one component to another.

The agent responder system 121 may be configured to assist agents to provide concierge-type services (e.g., making dinner reservations, purchasing event tickets, making travel arrangements, etc.). The agent responder system 121 may implement one or more trained predictive models to assist human agents throughout various stages such as customer request analysis and triage, recommendations, proposal, booking, fulfillment tracking and post-fulfillment stage (e.g., feedback survey generation and analysis). In some embodiments, the agent responder system 121 may generate personalized recommendations in response to a customer request. In some cases, the personalized recommendations may be tailored to the customer and generated based on predicted customer intent.

In some embodiments, the recommendations may be provided to an agent via a graphical user interface (GUI) on a user device 101-1, 101-2, 101-3 for the agent to select and/or further customize one or more selected recommendation as proposal(s) to the customer. The proposal may include information automatically generated by the agent responder system with or without agent's edits. In some cases, the information may include objective information such as the selected recommendation of a service meeting the customer request and the predicted customer intent, and subjective information such as insights and implicit customer preference extracted from customer data. The agent responder system 121 may assist and guide an agent to complete a proposal in a streamlined fashion via an agent responder user interface, and deliver the proposal to the customer via a customer user interface (e.g., in-app messaging, chat bot, etc.).

In some embodiments, the agent responder system 121 may be configured to train one or more predictive models (e.g., natural language processing) for analyzing input data (e.g., customer request data) transmitted from the customer device, generating personalized recommendations to be further customized by agents 103-1, 103-2 via one or more user devices 101-1, 101-2, 101-3, generating personalized feedback survey, and extracting insight (e.g., implicit customer preference).

The concierge network may be in integrated platform 100 that may allow consumers to conduct transactions and have the capability of tracking fulfillment of a service in a seamless fashion. In some cases, the agent responder system 121 may be configured to generate a personalized feedback survey to be presented to the customers and/or a feedback survey to be presented to third-party service providers. In some cases, customer feedback survey may be delivered to the customers after fulfillment of a service (e.g., in a post-fulfillment stage). In some cases, customer feedback may be collected and analyzed to extract insight where the insight data is used to augment the customer data, and to continual train the one or more predictive models.

The agent responder system 121 may be configured to perform one or more operations consistent with the disclosed methods described with respect to FIGS. 3-6. The agent responder system 121 may be implemented anywhere within the platform, and/or outside of the platform 100. In some embodiments, the agent responder system 121 may be implemented on the server. In other embodiments, a portion of the agent responder system 121 may be implemented on the user device. Additionally, a portion of the agent responder system 121 may be implemented on the third-party system. Alternatively or in addition to, a portion of the agent responder system 121 may be implemented in one or more databases 111, 123. The agent responder system 121 may be implemented using software, hardware, or a combination of software and hardware in one or more of the above-mentioned components within the platform. Details about the agent responder system 121 are described later herein.

In some embodiments, a user (e.g., agent) 103-1, 103-2 may be associated with one or more user devices 101-1, 101-2, 101-3. In some cases, a user (e.g., agent) may communicate with customers using a user device. For example, the user 103-1 may receive one or more customer requests, receive one or more auto-generated recommendations, edit and customize recommendations or proposals within an agent responder user interface rendered on the user device 101-1. The user 103-1 may also communicate with the customer via an instant communication channel running on the user device 101-1. The instant communication channel may be provided in a customer software or customer user interface provided by the platform 100.

User device 101-1, 101-2 may be a computing device configured to perform one or more operations consistent with the disclosed embodiments. Examples of user devices may include, but are not limited to, mobile devices, smartphones/cellphones, wearable device (e.g., smartwatches), tablets, personal digital assistants (PDAs), laptop or notebook computers, desktop computers, media content players, television sets, video gaming station/system, virtual reality systems, augmented reality systems, microphones, or any electronic device capable of analyzing, receiving (e.g., receiving user input as agent insight/comment, modification of fields in a proposal, expert recommendation, etc.), providing or displaying certain types of data (e.g., system generated recommendations, customer information, draft proposals, etc.) to a user. The user device may be a handheld object. The user device may be portable. The user device may be carried by a human user. In some cases, the user device may be located remotely from a human user, and the user can control the user device using wireless and/or wired communications. The user device can be any electronic device with a display.

User device 101-1, 101-2, 101-3 may include one or more processors that are capable of executing non-transitory computer readable media that may provide instructions for one or more operations consistent with the disclosed embodiments. The user device may include one or more memory storage devices comprising non-transitory computer readable media including code, logic, or instructions for performing the one or more operations. The user device may include software applications provided by the agent responder system 121 that allow the user device to communicate with and transfer data between server 120, the agent responder system 121, and/or database 111.

The user device 101-1, 101-2, 101-3 may include a communication unit, which may permit the communications with one or more other components in the platform 100. In some instances, the communication unit may include a single communication module, or multiple communication modules. In some instances, the user device may be capable of interacting with one or more components in the platform 100 using a single communication link or multiple different types of communication links.

User device 101-1, 101-2, 101-3 may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI) or a graphical user interface (GUI) rendered through an application (e.g., via an application programming interface (API) executed on the user device). The GUI may show customer requests, recommendation and images, interactive elements relating to a proposal or customer request (e.g., editable fields, tasks status, customer feedback, etc.). The user device may also be configured to display webpages and/or websites on the Internet. One or more of the webpages/websites may be hosted by server 120 and/or rendered by the agent responder system 121.

In some embodiments, users may utilize the user devices to interact with the agent responder system 121 by way of one or more software applications (i.e., client software) running on and/or accessed by the user devices, wherein the user devices and the agent responder system 121 may form a client-server relationship. For example, the user devices may run dedicated mobile applications or software applications for viewing customer requests and recommendations provided by the agent responder system 121. The software applications for generating recommendations, customizing a proposal, and for establishing instant communications and delivering the proposal may be different applications. Alternatively or in addition, the mobile application may comprise different modes for an agent to customize/edit proposals and to communicate with customers (e.g., service requester) respectively. The mobile applications for a customer (e.g., service requestor) and an agent (e.g., service responder) may be different applications.

In some embodiments, the client software (i.e., software applications installed on the user devices 101-1, 101-2, 101-3) may be available either as downloadable mobile applications for various types of mobile devices. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms.

In some embodiments, the provided platform may generate one or more graphical user interfaces (GUIs) for the agent responder interface. The GUIs may be rendered on a display screen on a user device (e.g., a participant device). A GUI is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. In addition to computers, GUIs can be found in hand-held devices such as MP3 players, portable media players, gaming devices and smaller household, office and industry equipment. The GUIs may be provided in software, a software application, a mobile application, a web browser, or the like. The GUIs may be displayed on a user device (e.g., desktop computers, laptops or notebook computers, mobile devices (e.g., smart phones, cell phones, personal digital assistants (PDAs), and tablets), and wearable devices (e.g., smartwatches, etc.).

In some cases, third-party user interfaces or APIs may be integrated to the mobile application and integrated in the front-end user interface (e.g., within the GUI). The third-party user interfaces may be hosted by a third-party server 130. In some cases, APIs or third-party resources (e.g., map service provider, hotel inventory) may be used to provide recommendations of services or proposals in response to a customer request. In some cases, APIs or third-party resources may be used to fulfill other service request. For example, the platform 100 may utilize API requests to interact with various service providers to aggregate those services for fulfill requests from a customer or interact with a third-party credit institution to perform transactions (e.g., e-commerce transactions, electronic payment or online transactions). In some cases, the payments or transaction history of a customer may be tracked by a transaction/payment network component of the platform 100 when the customer performs transactions via the payment network of the platform 100. For instance, once a customer accepts a proposal and decides to proceed with the payment, the third-party service provider (e.g., merchant) may capture the customer credit card account information and submit it with the transaction details as an authorization request to a payment processor. The payment processor may submit the authorization request to the payment network, which may then pass the authorization request to the bank or credit card company. Upon verifying the account, an authorization response is returned to the payment network. Next, the payment network may pass the authorization response to the payment processor, who may then pass the authorization response to the merchant.

User devices may be associated with one or more users. In some embodiments, a user may be associated with a unique user device. Alternatively, a user may be associated with a plurality of user devices. A user may be registered with the platform. In some cases, for a registered user, user profile data may be stored in a database (e.g., database 123) along with a user ID uniquely associated with the user. The user profile (e.g., agent profile) data may include, for example, user names, user ID, identity, expert or service attributes such as specialties, expertise, special credentials, gender, contact information, historical data, ratings, and various others as described elsewhere herein. In some cases, a registered agent may be requested to log into the agent account with a credential. For instance, in order to perform activities such as responding to an alert/request with the system 121, an agent may be required to log into the application by performing identity verification such as providing a passcode, scanning a QR code, biometrics verification (e.g., fingerprint, facial scan, retinal scan, voice recognition, etc.) or various other verification methods via the user device 103-1, 103-2, 103-3.

A server 120 may access and execute the agent responder system 121 to perform one or more processes consistent with the disclosed embodiments. In certain configurations, the agent responder system may be software stored in memory accessible by a server (e.g., in memory local to the server or remote memory accessible over a communication link, such as the network). Thus, in certain aspects, the agent responder system(s) may be implemented as one or more computers, as software stored on a memory device accessible by the server, or a combination thereof. For example, one agent responder system(s) may be a computer executing one or more algorithms for pre-training a predictive model, and another agent responder system may be software that, when executed by a server, processing customer request or recommendations using the trained predictive model.

The agent responder system 121 though is shown to be hosted on the server 120. The agent responder system 121 may be implemented as a hardware accelerator, software executable by a processor and various others. In some embodiments, the agent responder system 121 may employ an edge intelligence paradigm that data processing and prediction is performed at the edge or edge gateway. In some cases, a predictive model for extracting data points from customer request or generating recommendations may be built, developed and trained on the cloud/data center 120 and run on the user device and/or other devices local to the user (e.g., hardware accelerator) for inference. For example, the predictive model for generating recommendations may be pre-trained on the cloud and transmitted to the user device for implementation. In some cases, the predictive model may go through continual training as new customer data and feedback data are collected. The continual training may be performed on the cloud or on the server 120. In some cases, customer data may be transmitted to the remote server 120 which are used to update the model for continual training and the updated model (e.g., parameters of the model that are updated) may be downloaded to the physical system (e.g., user device, software application of the concierge network, third-party system) for implementation.

In some cases, at least a portion of data processing can be performed at the edge (i.e., user device). In some cases, the predictive model for recommendation may be built, developed, trained, improved, maintained on the cloud, and run on the edge device or client terminal (e.g., hardware accelerator) for inference. Alternatively or in addition to, customer data collected at the edge device or client terminal may be pre-processed locally before sending to the cloud. For example, the client terminal or customer application may comprise a data processing module to provide functions such as ingesting of data streams (e.g., audio/video streams, chat messages, etc.) into a local storage repository (e.g., local time-series database), data cleansing, data enrichment (e.g., decorating data with metadata), data alignment, data annotation, data tagging, or data aggregation. The pre-processed customer data may then be transmitted to the server 120 for training or updating a model.

In some cases, suitable data processing techniques such as voice recognition, facial recognition, natural language processing, sentiment analysis and the like may be employed to pre-process the customer data and customer feedback data. For example, sentiment analysis may be applied to chat messages which utilizes a trained model to identify and extract opinions within a given chat message. The above-mentioned data processing may be performed on the customer device or on the server 120. The processed customer data and customer feedback data may be used to form at least part of the input feature vector to train a predictive model.

The various functions performed by the client terminal and/or the agent responder system such as data processing, training a predictive model, executing a trained model, continual training a predictive model, implementing predetermined ruleset for generating proposals and the like may be implemented in software, hardware, firmware, embedded hardware, standalone hardware, application specific-hardware, or any combination of these. The agent responder system, edge computing platform, and techniques described herein may be realized in digital electronic circuitry, integrated circuitry, specially designed ASICs (application specific integrated circuits), computer hardware, firmware, software, and/or combinations thereof. These systems, devices, and techniques may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, and/or device (such as magnetic discs, optical disks, memory, or Programmable Logic Devices (PLDs)) used to provide machine instructions and/or data to a programmable processor.

The third-party system 130 can be any entities that provides services to the customers via the platform 100. The third-party entity may provide services in a wide range such as dining, ticket events platform (e.g., Stubhub), travel (e.g., flight), retail, hotel, and various others. The third-party system 130 may be in communication with the agent responder system via APIs such that the third-party inventory, service information, availability information and the like can be communicated. Various other functions such as payment transaction and service fulfillment tracking can also be provided via API integration points. For instance, customers may also be permitted to conduct transaction with the third-party service providers 130 (e.g., credit card company, bank, etc.) through a payment network of the platform. The API integration points may comprise, for example, a plug-in (a locally-defined interface) that allows translation of the data representation of a specific API provider to an internal representation of an API management system, a set of translators and protocol drivers capable of communicating the system functional requests to any one of a set of online services, third-party systems, using their corresponding proprietary protocols.

In some cases, the server 120 may also be configured to store, search, retrieve, and/or analyze data and information stored in one or more of the databases. The data and information may include raw data collected from the user/customer device as well as user/customer profile data, data about a predictive model (e.g., parameters, model architecture, training dataset, performance metrics, threshold, etc.), data generated by a predictive model such as recommendations or extracted insight, feedback survey, feedback data and the like. While FIG. 1 illustrates the server as a single server, in some embodiments, multiple devices may implement the functionality associated with a server.

A server may include a web server, an enterprise server, or any other type of computer server, and can be computer programmed to accept requests (e.g., HTTP, or other protocols that can initiate data transmission) from a computing device (e.g., user device and/or meeting capturing device) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include known computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

Network 110 may be a network that is configured to provide communication between the various components illustrated in FIG. 1. The network may be implemented, in some embodiments, as one or more networks that connect devices and/or components in the network layout for allowing communication between them. For example, user device 101-1, 101-2, 101-3 third-party system 130, server 120, agent responder system 121, and database 111, 123 may be in operable communication with one another over network 110. Direct communications may be provided between two or more of the above components. The direct communications may occur without requiring any intermediary device or network. Indirect communications may be provided between two or more of the above components. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, 5G or Long Term Evolution (LTE) protocols, Infra-Red (IR) communication technologies, and/or Wi-Fi, and may be wireless, wired, or a combination thereof. In some embodiments, the network may be implemented using cell and/or pager networks, satellite, licensed radio, or a combination of licensed and unlicensed radio. The network may be wireless, wired, or a combination thereof.

User device 101-1, 101-2, 101-3 third-party meeting system 130, server 120, or agent responder system 121, may be connected or interconnected to one or more database 111, 123. The databases may be one or more memory devices configured to store data. Additionally, the databases may also, in some embodiments, be implemented as a computer system with a storage device. In one aspect, the databases may be used by components of the network layout to perform one or more operations consistent with the disclosed embodiments. One or more local databases, and cloud databases of the platform may utilize any suitable database techniques. For instance, structured query language (SQL) or "NoSQL" database may be utilized for storing the instant messaging data (e.g., audio/video data, chat messages, etc.), customer/agent profile data, historical data, predictive model, training datasets, or algorithms. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some embodiments, the platform 100 may construct the database for fast and efficient data retrieval, query and delivery. For example, the agent responder system 121 may provide customized algorithms to extract, transform, and load (ETL) the data. In some embodiments, the agent responder system 121 may construct the databases using proprietary database architecture or data structures to provide an efficient database model that is adapted to large scale databases, is easily scalable, is efficient in query and data retrieval, or has reduced memory requirements in comparison to using other data structures.

In some embodiments, the one or more database systems 123, 111, which may be configured for storing or retrieving relevant data. Relevant data may comprise user data (e.g., agent ID, specialties, expertise/skills, training credentials, ratings, availability, geolocation, service category/field, etc.), customer profile data (e.g., customer preferences, personal data such as identity, age, gender, contact information, demographic data, ratings, subscription, member redemption of loyalty points, etc.), augmented customer data records (e.g., labeled with additional data related to customer intent, service type, expert insight, customer segmentation, etc.), historical data (e.g., social graph, transportation history, transportation subscription plan data, purchase or transaction history, loyalty programs, etc.), and various other data as described elsewhere herein. In some cases, the agent responder system 121 may source data or otherwise communicate (e.g., via the one or more networks 110) with one or more external systems or data sources 111, such as one or more local data service, ontology knowledge base, map, weather, or traffic application program interface (API) or map database. In some instances, the agent responder system 121 may retrieve data from the database systems 111, 123 which are in communication with the one or more external systems (e.g., location data sources, mobility service providers, vehicle dispatching system, etc.) or third-party systems 130 (e.g., third-party commerce entities such as food, restaurants, hospitality, ticketing event entities, theaters, digital service providers, etc.).

In some cases, the database may store data related to machine learning-based models. For example, the database may store data about a trained personalized predictive model (e.g., parameters, hyper-parameters, model architecture, training dataset, performance metrics, threshold, rules, etc.), data generated by a personalized predictive model (e.g., intermediary results, output of a model, latent features, input and output of a component of the model system, etc.), training datasets (e.g., labeled data, insight provided by expert, user feedback data, etc.), predictive models, algorithms, and the like. The database can store algorithms or ruleset utilized by one or more methods disclosed herein. For instance, pre-determined ruleset to be used in combination with machine learning trained models for allocating customer requests to relevant human agents may be stored in the database. In certain embodiments, one or more of the databases may be co-located with the server, may be co-located with one another on the network, or may be located separately from other devices. One of ordinary skill will recognize that the disclosed embodiments are not limited to the configuration and/or arrangement of the database(s).

In some cases, data stored in the database can be utilized or accessed by a variety of applications through application programming interfaces (APIs). Access to the database may be authorized at per API level, per data level (e.g., type of data), per application level or according to other authorization policies.

Although particular computing devices are illustrated and networks described, it is to be appreciated and understood that other computing devices and networks can be utilized without departing from the spirit and scope of the embodiments described herein. In addition, one or more components of the network layout may be interconnected in a variety of ways, and may in some embodiments be directly connected to, co-located with, or remote from one another, as one of ordinary skill will appreciate.

Various aspects of the present disclosure may be applied to any of the particular applications set forth below or for any other types of applications or systems. Systems or methods of the present disclosure may be employed in a standalone manner, or as part of a package.

Figure 2:
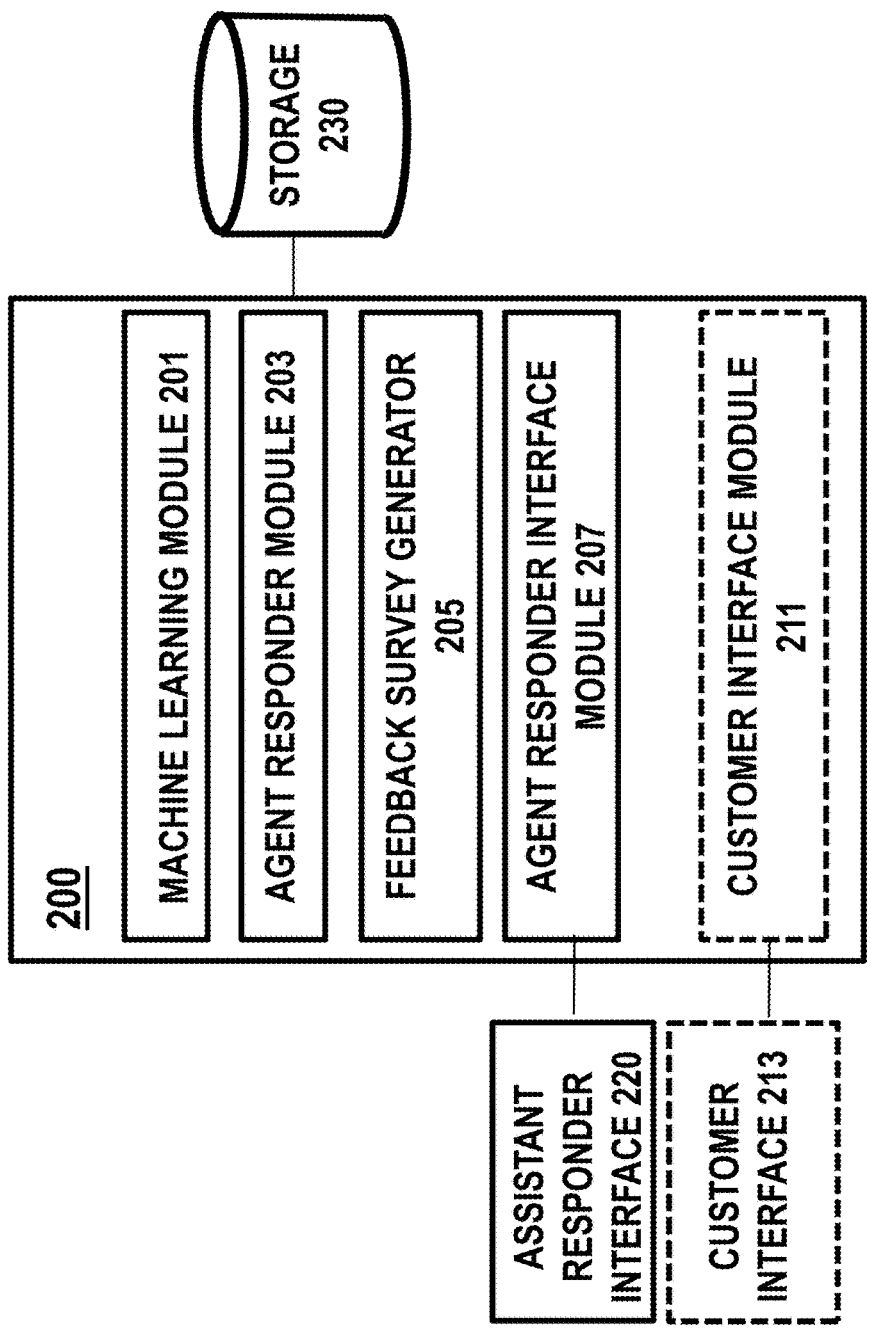
FIG. 2 schematically shows a block diagram of an agent responder system, in accordance with various embodiments of the present disclosure.

FIG. 2 schematically shows a block diagram of an agent responder system 200, in accordance with various embodiments of the invention. In some embodiments, the system 200 may comprise a machine learning module 201, an agent responder module 203, a feedback survey generator 205, and an agent responder interface module 207. The system may optionally comprise a customer interface module 211. Alternatively, the customer interface module may be a separate component that is operably coupled to the system 200. The system 200 may be the same as the agent responder system as described in FIG. 1. The system 200 may employ machine learning algorithms to analyze customer request data, predict customer intent based on limited user input data, generate personalized recommendations to agent, generate personalized survey or extract insight.

In some embodiments, the machine learning module 201 may be configured to train one or more predictive models. The one or more predictive models may be trained to process customer request data, generate personalized recommendations, and various other functions described herein. In some cases, the input data to the one or more predictive models may comprise customer request about a service. The customer request may include limited information such as a request of concierge-type service. For instance, the request may not include all the information sufficient for performing search of a service by a conventional digital assistant system. In some cases, the service may include making restaurant recommendations and reservations, arranging hotel accommodations, recommending places to visit, booking transportation, lining up tickets for concerts or special events, planning a holiday trip that and the like. The output of the predictive model may be proposed service based on a predicted customer intent or the limited customer input data as described above. The proposal may include highly personalized features such as insight or personalized service experience tailored to the customer.

The machine learning algorithm can be any type of machine learning network such as a neural network. Examples of neural networks include a deep neural network, a convolutional neural network (CNN), and a recurrent neural network (RNN). The machine learning algorithm may comprise one or more of the following: a support vector machine (SVM), a naive Bayes classification, a linear regression model, a quantile regression model, a logistic regression model, a random forest, a neural network, CNN, RNN, a gradient-boosted classifier or repressor, or another supervised or unsupervised machine learning algorithm (e.g., generative adversarial network (GAN), Cycle-GAN, etc.).

The machine learning module 201 may be capable of providing a personalized predictive model for a service or a type of service (e.g., hotel, travel, events, etc.), to generate recommendations by processing customer request data. The predictive model may be continually trained and improved using proprietary data or relevant data (e.g., feedback data, customer data collected from past service history or from the same customer segmentation) so that the output can be better adapted to the specific customer or type of service. In some cases, a predictive model may be pre-trained and implemented on the physical system, and the pre-trained model may undergo continual re-training that involves continual tuning of the predictive model or a component of the predictive model (e.g., classifier) to adapt to changes in the implementation environment over time (e.g., new insights, model performance, user-specific data, etc.). The continual training process may require customer feedback data or expert input. In some embodiments, the customer feedback data may be collected in response to a personalized feedback survey generated by the feedback survey generator 205. Alternatively or additionally, the customer feedback data may be used in the pre-training phase.

In some cases, the one or more predictive models may not be further changed after the model is deployed. In such cases, a fixed model may be executed and used for generating recommendations in implementation. Alternatively, the one or more predictive models may go through a training stage, an adaptation stage and/or an optimization stage. The adaptation stage and/or optimization stage may beneficially provide customer-specific or service-specific adaptation of the model.

The training method may include supervised learning, semi-supervised learning or unsupervised learning. For example, the training method may involve pre-training one or more components of the predictive model, the adaptation stage may involve training the predictive model to adapt to a customer to which the pre-trained model is applied, and the optimization stage may involve further continual tuning of the predictive model or a component of the predictive model (e.g., classifier) to adapt to changes in the implementation environment over time (e.g., changes in the physical system, model performance, customer-specific data, etc.).

In some cases, the model network for generating recommendations may be obtained using supervised learning methods that require labeled datasets. In some cases, labeled datasets (e.g., insights, recommendation) may be retrieved from a database, external data sources, or provided by one or more human users. In some cases, the labeled data may be provided by experts (e.g., expert assistant, agent, etc.) or extracted from a customer segmentation. The training dataset may comprise customer data, customer request, chat messages, user feedback and the abovementioned labeled dataset.

In some cases, the input data to the predictive model may be customer request data and supplier resource data or user feedback data. In some cases, the input data may be pre-processed data. Suitable data processing techniques such as voice recognition, facial recognition, natural language processing, sentiment analysis and the like may be employed to pre-process the raw customer request data and/or user feedback data. For example, sentiment analysis that utilizes a trained model to identify and extract opinions within a given chat message may be applied. The pre-processed customer request data or user feedback data may be used to generate the input feature vector to the predictive model.

The agent responder module 203 may comprise a plurality of functional components for analyzing customer request data, generating recommendations to agent based on customer data and/or generating personalized feedback survey. The agent responder module 203 may also be configured to manage customer requests, generate proposal to be delivered to customers, assist in-app transactions and track fulfillment of a service. The agent responder module 203 may execute one or more trained predictive models as described above to assist human agents throughout various stages such as customer request analysis and triage, recommendations, proposal, booking, fulfillment tracking and post fulfillment stage (e.g., feedback survey). The agent responder module 203 may be in communication with or be integrated to a customer interface module 211. For example, the agent responder module 203 may receive customer request data user feedback data and deliver one or more proposals to the customer via a chatbot or communication channel provided by the customer interface module 211. The one or more communication channels may include, but not limited to, a website channel, email channel, text message channel, digital virtual assistant, smart home device such as Alexa®, interactive voice response (IVR) systems, social media channel and messenger APIs (application programming interfaces) such as Facebook channel, Twilio SMS channel, Skype channel, Slack channel, WeChat channel, Telegram channel, Viber channel, Line channel, Microsoft Team channel, Cisco Spark channel, and Amazon Chime channel, and various others. In some cases, the personalized feedback survey may also be presented to the customer via the customer interface 213 provided by the customer interface module 211.

The feedback survey generator 205 may be configured to generate one or more surveys or questionnaires based on customer data, the proposal, and/or the fulfillment tracked by the system. In some cases, one or more surveys may be generated for each service request. The one or more surveys may be generated before, during or after a service is fulfilled.

The content of the surveys and the timing of delivering the surveys may be determined based at least in part on the customer data, proposal and tracked fulfillment. In some cases, the proposal data may comprise information as duration of a service (e.g., time in minutes), service start/end time, location, service type, event type or others. The fulfillment data may comprise information such as how a service is provided and when the service is completed. In some cases, the fulfillment data may be retrieved or collected from the third-party service suppliers. The proposal and/or tracked fulfillment data may be used to determine when to deliver a feedback survey to a customer (e.g., 1 hour/day after service end time, etc.). The proposal and/or fulfillment data may be used to determine the content of a feedback survey. For example, survey questions may be generated based on the user experience during the service, or whether the user likes the proposal. The feedback survey generated for different requests may be different. The feedback survey generated for different requests associated with the same customer may be different. Alternatively or additionally, a feedback survey generated for customers that belong to the same customer segmentation may be the same. In some cases, the feedback survey may be delivered to a customer via the customer interface 213. In some cases, the feedback survey may be edited, or further personalized by an agent who responded to the request via the assistant responder interface 220 before being delivered to the customer.

The agent responder interface module 207 may be configured for agents to interact with customer requests, recommendations generated by the system, proposals, tracked fulfillment information, notifications, and various other data as described above. The agent responder user interface (UI) module may provide a graphical user interface (GUI) that can be integrated into other applications (e.g., customer application), or via any suitable communication channels (e.g., email, Slack, SMS) for delivering notifications. A user (e.g., agent) may preview, edit, save, create recommendation or proposals via the GUI. For example, the user input may be provided via the graphical user interface (GUI), webhooks that can be integrated into other applications, or via any suitable communication channels (e.g., email, Slack, SMS).

In some embodiments, the GUIs may be rendered on a display screen on a user device (e.g., an agent device). The user interfaces and functionality described herein may be provided by software executing on the user's computing device, by responder agent system located remotely that is in communication with the computing device via one or more networks, and/or some combination of software executing on the computing device and the agent responder system. The user interfaces may be provided by a cloud computing system.

The customer user interface (UI) module 211 may be configured for representing and delivering proposals, establishing instant communications with virtual or human agent, and providing a payment platform for conducting various transactions. In some cases, the customer interface may permit a customer submit a request with simple user input (e.g., text message). The customer interface (UI) module 211 may provide a graphical user interface (GUI) that can be integrated into other applications, or via any suitable communication channels (e.g., email, Slack, SMS) for presenting the feedback survey, proposals or messages from a virtual/human agents. The customer interface module 211 may provide a chatbot. The chatbot can also be accessed via any suitable conversational channels such as smart home device, voice assistance, home automation system, interactive voice response (IVR) systems and the like. For instance, a chatbot may be activated using a wake-word.

A customer may provide user input or feedback via the GUI to interact with the system. For example, the user feedback may be provided via the graphical user interface (GUI), webhooks that can be integrated into other applications, or via any suitable communication channels (e.g., email, Slack, SMS). In some embodiments, the user feedback may be provided via a user interface (UI). The UI may include a UI for representing feedback survey generated by the feedback survey generator 205 to the user and receiving user input from a user (e.g., through user device). The user interface may comprise using of one or more user interactive device (e.g., mouse, joystick, keyboard, trackball, touchpad, button, verbal commands, gesture-recognition, attitude sensor, thermal sensor, touch-capacitive sensors, AR or VR devices). In some cases, the UI may comprise a GUI for displaying feedback survey and receiving user feedback, and a separate GUI for users to view recommendations generated by the agent responder module.

One or more of the multiple components may be coupled to a database 230. The database can be the same as the database 111, 123 as described in FIG. 1. In some embodiments, the agent responder system may implement one or more trained predictive models to assist human agents throughout various stages such as customer request analysis and triage, recommendations, proposal, booking, fulfillment tracking and feedback survey. The agent responder system may implement the methods described with respect to FIGS. 3-6.

Figure 3:
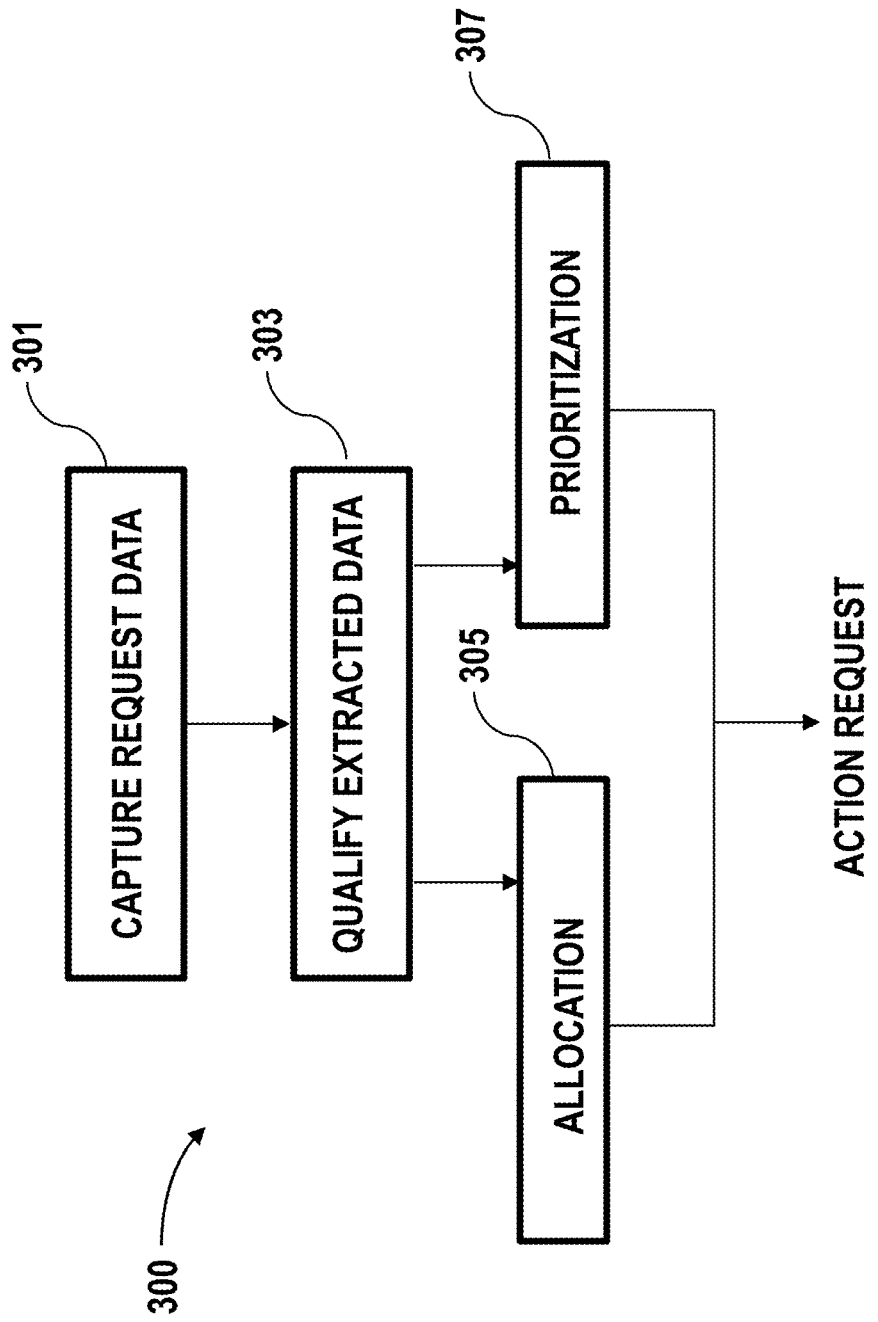
FIG. 3 illustrates an example of method of performing customer requests analysis and triage, according to some embodiments described herein.

FIG. 3 illustrates an example of a method 300 of performing customer requests analysis and triage, according to some embodiments described herein. Customer request data may be captured (operation 301). The customer request data may be received via a customer interface (e.g., chat bot, instant messaging, etc.) as described above. The captured customer request data may be processed to extract and identify qualified request data points (operation 303). The extracted request data points may include, for example, type of request (e.g., hospitability, travel, restaurant, theater, event, etc.), time, location, party size, occasion, and others. For instance, the customer request may be a dining request that may comprise request data points specifying a specific restaurant, party size, date and time requested, special occasion and the like. In some cases, the customer request may comprise incomplete information such as special occasion and party size which may not be sufficient to be used as search query directly. In some embodiments, NLP engine may be used to process the input data (e.g., input text captured from chatbot) and produce a structured output including the linguistic information. The NLP engine may employ any suitable NLP techniques such as a parser to perform parsing on the input text. A parser may include instructions for syntactically, semantically, and lexically analyzing the text content of the input documents and identifying relationships between text fragments in the documents. The parser makes use of syntactic and morphological information about individual words found in the dictionary or "lexicon" or derived through morphological processing (organized in the lexical analysis stage). In an example, the input data analysis process may comprise multiple stages including, creating items, segmentation, lexing and parsing.

Next, the customer request may enter the triage stage. The triage stage may comprise allocating (operation 305) the requests to one or more agents and/or prioritized (operation 307) the requests based on the extracted request data points. In some cases, the customer requests may be assigned to different agents based on the type of request, date of the request, specific request details and the agent profile (e.g., availability of the agent, specialties of the agent, location of the agent, etc.). For instance, the allocation operation may be performed by an agent profile matching unit which is invoked to determine an agent via profile matching. For example, if the extracted request data points indicate the type of request is travel, a travel agent may be selected. The profile matching may be conducted in one or more fields (e.g., request type, location, time, availability of agent, etc.) based on the extracted data points. In some cases, the allocation operation may also determine that an agent has a domain or service matching an estimated customer intent. The user intent may be extracted using a machine learning algorithm trained model as described elsewhere herein.

In some cases, the prioritization process (operation 307) may determine routing the request to a human agent or a virtual agent based on the extracted request data points. A virtual agent may be capable of generating recommendations and proposals without human intervention. For example, when the extracted request data points meet the criteria for being processed by the virtual agent (e.g. sufficient information such as a specific restaurant for specified date/time and party size), the request may be routed to a virtual agent to generate proposals for the dining request. In another example, if the extracted request data points indicate private aviation which request a human responder on-line that specializes in such type of request, or indicate a request for a safari in South Africa that requires a human responder that is an expert in this field, the request may be routed to the human agent identified by the allocation operation 305.

Figure 4:
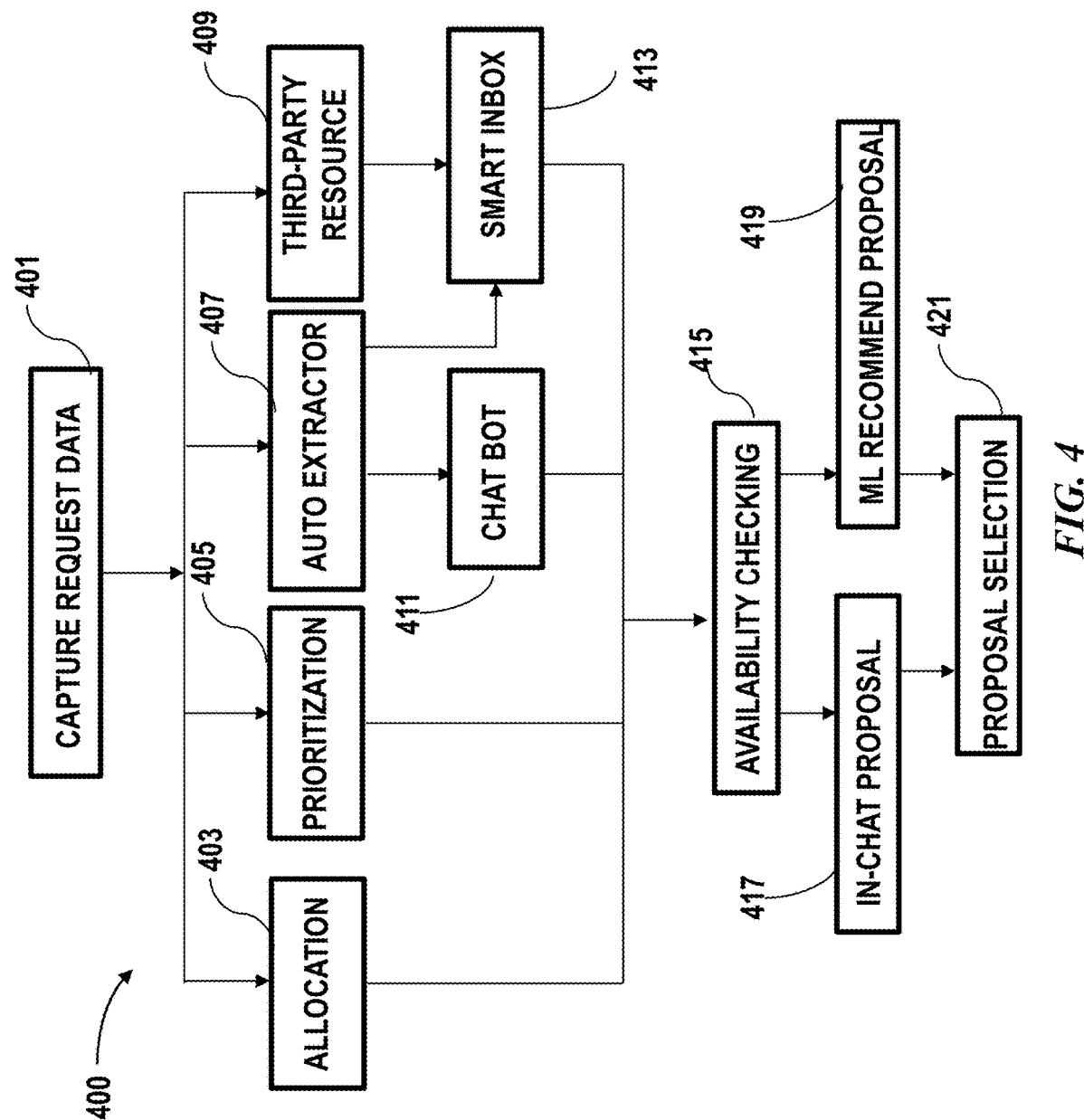
FIG. 4 illustrates an example of a method in the triage stage, recommendation stage and proposal stage.

FIG. 4 illustrates an example of a process 400 including triage stage, recommendation stage and proposal stage. Referring to FIG. 4, the operation for capturing request data 401 can be the same as the operation as described in FIG. 3. Similarly, the request data is processed to extract request data points. The extracted request data points may be used for allocation (operation 403), prioritization (operation 405), auto extraction (operation 407) and for retrieving the relevant third-party resources 409.

The prioritization operation 405 can be the same as the operation as described above. For example, the prioritization operation 405 may determine routing the request to a human agent or a virtual agent based on the extracted request data points. In some cases, if the request is decided to be processed by a virtual agent, the request data may be processed by auto extractor 407 to extract the type of service such that the customer's utterance is routed to the corresponding virtual agent matching the service type to enable a conversation between the virtual agent and the customer (chat bot 411). During the conversation between the virtual agent and the user, the virtual agent may analyze dialog states of the dialog and manage real-time tasks related to the dialog, based on data stored in various databases, e.g. a knowledge database, a publisher database, the various third-party resources 409 and smart inbox 413. The virtual agent may also provide service recommendation to the user based on a customer database and the predicted customer intent. In some cases, when the virtual agent determines that the customer's intent has changed or the user is unsatisfied with the current dialog, the virtual agent may redirect the customer request to a different agent based on a virtual agent database. The different agent may be a different virtual agent or a human agent. The escalation may be seamless and not causing any delay to the use.

The third-party resource 409 may comprise a centralized partner communication gateway to enable communication with service suppliers such as restaurant partner, event partner, flight partner, hotel partner, retail partner and various others. For instance, APIs may be used to enable real-time digital communications (e.g., email 413, messaging) between the virtual agents and the third-party partners. For instance, queries generated based on the extracted request data points may be communicated to the third-party service suppliers via the smart inbox 413 and the relevant information may be received and used for generating recommendations and/or proposals to the customer by the auto extractor 407 and chat bot 411.

Next, proceeding with the recommendation and proposal stage, the agent responder system may perform availability checking (operation 415). The availability information may be obtained from the smart inbox 413, third-party inventory (e.g., through third-party APIs integration points) based on the extracted request data points. In some embodiments, the input feature data to be processed by a machine learning trained model (operation 419) may be generated based on the availability information, the extracted request data points, and customer data. The machine learning algorithm trained model may output one or more recommended proposals to the agent for selection (operation 421) or further customization.

The one or more recommended proposals may be provided to an agent via an interactive graphical user interface such that the agent is prompted to edit one or more fields of the proposals. The proposal may include information such as the details of the service (e.g., time, location, hotel room, restaurant seat, etc.) and personalized insights (e.g., recommended dishes, events). The user (e.g., agent) may be permitted to modify one or more fields of the recommended proposal.

In some cases, proposal may be presented in a hierarchical data structure such that the editable fields are arranged in hierarchical levels. The hierarchical data structure may be service-specific. For instance, the hierarchical data structure may be different in different service areas (e.g., restaurant, hotel, etc.) For example, the hierarchical data structure for a hotel proposal may be based on the hotel stock keeping unit (SKU) which can be different from a restaurant proposal. In another example, the hierarchical data structure for a restaurant proposal may comprise a plurality customizable fields in the item level (e.g., the restaurant name, address, description, photos, URL, menu, etc.) and sub-item level (e.g., specific date/times being proposed, party size, cancellation policy or terms).

The proposal may include editable objective fields and subjective fields. The objective fields may include the various fields arranged in the hierarchical data structure as described above. The objective fields may include objective data that are obtained from the external data resources based on the customer request. The subjective fields may include subjective data such as insight that are recommendations tailored to the customer. For example, in a restaurant proposal, the objective data may include the name of the restaurant, address, website URL, menus, photos, a description from Google, etc. and the subjective data may include a custom synopsis tailored to the users provided by an expert in the field and/or artificial intelligence-based model (e.g., "Don't Miss" section which describes the favorite dishes or insider tips for a venue even if the customer has not been there before).

In some cases, additional information may be obtained via in-app messaging or communication with the customer to generate different proposals (operation 417). For instance, customer may provide input in response to an initial proposal. The additional customer input may be analyzed by the NPL engine to extract opinion such as deny or not satisfied, or request data points such as additional requirement, and such additional customer input data may be used to produce a new proposal.

Figure 5:
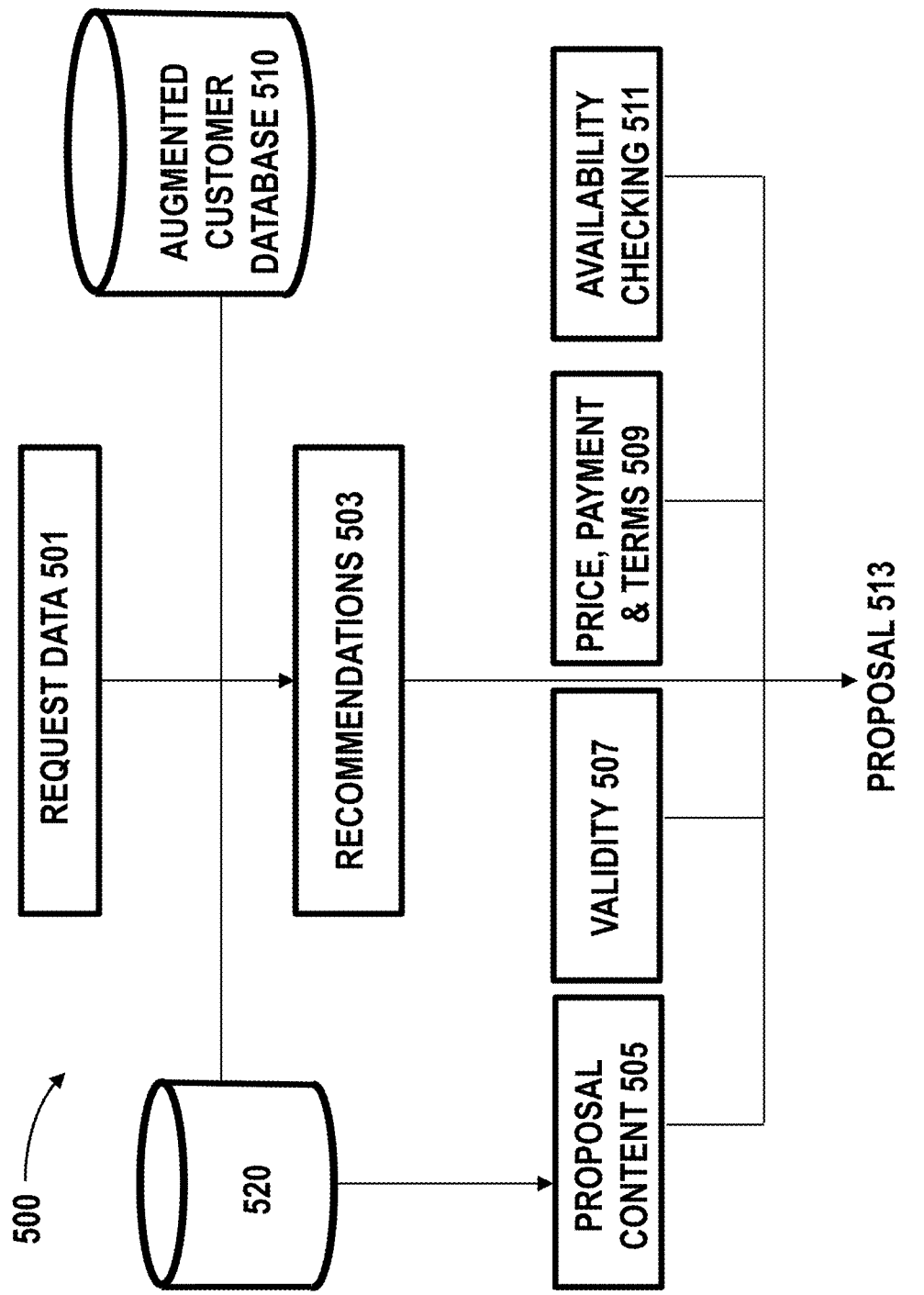
FIG. 5 shows an example of a process for generating recommended proposals, in accordance with some embodiments of the present disclosure.

In some embodiments, the recommendation stage may include operations to generate one or more recommended proposals with aid of machine learning algorithm trained model and provide an interactive graphical user interface for an agent to select and further customize the recommended proposals. The model may be trained to generate an optimal number of recommended proposals with an optimal amount of information for presenting to the agent. This may beneficially provide the agents with the optimized amount of information and the necessary flexibility for the agent to further customize the proposal. FIG. 5 shows an example of a process for generating recommended proposals, in accordance with some embodiments of the present disclosure.

In some cases, the customer input data 501 received from the customer interface may be analyzed and the request may be allocated to a matching agent. One or more recommended proposals 503 may be generated and presented to an agent via the agent responder interface. As described above, the recommended proposals may be generated based on customer data, availability information obtained from the third-party resources, inventory (e.g., through third-party APIs integration points) retrieved using the extracted request data points. In some embodiments, the input feature data to be processed by a machine learning trained model (operation 503) may be generated based on the availability information, the extracted request data points, and customer data retrieved from an augmented customer database 510.

The augmented customer database 510 may store customer data and augmented data. In some embodiments, the customer data (e.g., demographic data, purchase data, social graph, etc.) may be augmented with insight data. The customer data may include customer profile data as described elsewhere herein. For instance, the customer data may include customer profile information (e.g., name, address, spouse, age, gender, activation date, etc.), user preferences (questionnaire results, user feedback collected during registration or subscription), App Usage (content viewed/engaged with), Request History (history of requests and statuses), Fulfillment History (all bookings made through the platform), Transaction History (transactional data through platform), and various others.

In some cases, the customer data may be augmented with insight data extracted from the personalized feedback survey or an expert input in a particular field. For instance, the insight data may be an implicit user preference extracted from the personalized feedback survey or an expert input tailored to the customer and the service. In some cases, the implicit user preference and/or the insight data may be extracted from the feedback survey and tracked fulfillment data using a machine learning trained model. For instance, the extracted insight data may be a travel preference extracted from fulfillment data that indicates user-preferred transportation mode (e.g., autonomous vehicle, public transportation (such as train, light rail, or city bus), shuttle, ride-sharing, ride-hailing, shared trip or private trip, walking, bicycle, e-scooter, taxi, etc.), or user experience inside a vehicle (e.g., access to music, game) and the like. Such insight data can be further used to personalize a future service such as using the travel preferences to determine the travel route, transportation mode for a trip, and/or stops (e.g., scenic views, restaurants, coffee shops, etc.) during the travel route. In another example, the insight data may be extracted from feedback survey such as customer's comments on a hotel accommodation (e.g., room temperature, view, noise, etc.).

One or more recommended proposals may be generated using proposal content 505 retrieved from database 520, validity information 507 (e.g., validity on the customer qualified for a request), price, payment and terms 509 and availability of the service 511 and others. One or more fields of the recommended proposal can be edited and further customized by an agent as described above. A preview of the proposal may be displayed on a graphical user interface along with editable fields of the proposal. In some cases, at least a portion of the proposal content (e.g., images, texts, etc.) is retrieved from the database 520 for generating a preview of the proposal. After the agent completes editing a selected proposal 513, the proposal may be pushed to the customer interface module and displayed to the customer.

Figure 6A:
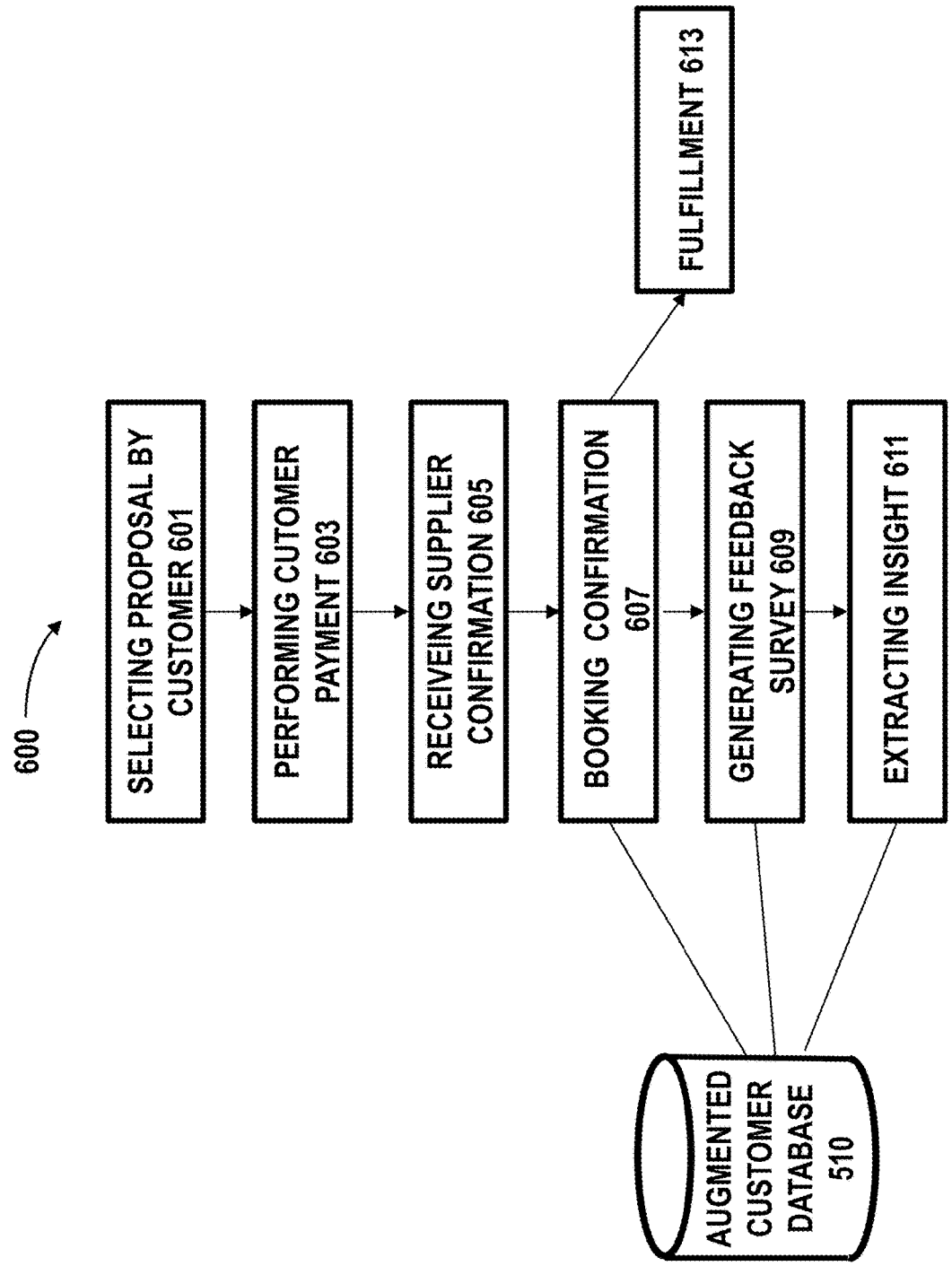
FIG. 6A shows an exemplary process in the booking, fulfillment stage and a post fulfillment stage.

FIG. 6A shows an exemplary process 600 in the booking, fulfillment stage and a post fulfillment stage. After the proposals are completed by the agent, one or more proposals may be delivered to the customer via the customer interface. A customer may select a proposal to proceed with (operation 601). As described above, if payment is required, the customer may proceed with the payment (operation 603) within the application (i.e., through the payment network of the platform) and the third-party service provider (e.g., merchant) may capture the customer credit card account information and submit it with the transaction details as an authorization request to a payment network in a process as described above.

Upon receiving the payment or customer confirmation on a proposal, the service supplier may confirm the proposal (operation 605) and confirm booking of the service (operation 607). In some embodiments, fulfillment of the service may be tracked by the system (operation 613). In some cases, fulfillment of the service may be tracked through an API integration point with the service supplier.

Next, during or after a service is completed, a personalized feedback survey 609 may be generated. The personalized feedback survey can be generated by the feedback survey generator as described in FIG. 2. In some cases, a feedback survey to a service supplier may also be generated to collect service supplier feedback. The collected customer feedback data and/or service supplier feedback data may be processed by a machine learning trained model to extract insight (operation 611). In some embodiments, data generated during the process such as booking information, transaction information, feedback data, and insight may be stored in the augmented customer database 510. At least a portion of the data can be used to update and continual train one or more predictive models of the system as described elsewhere herein.

Figure 6B:
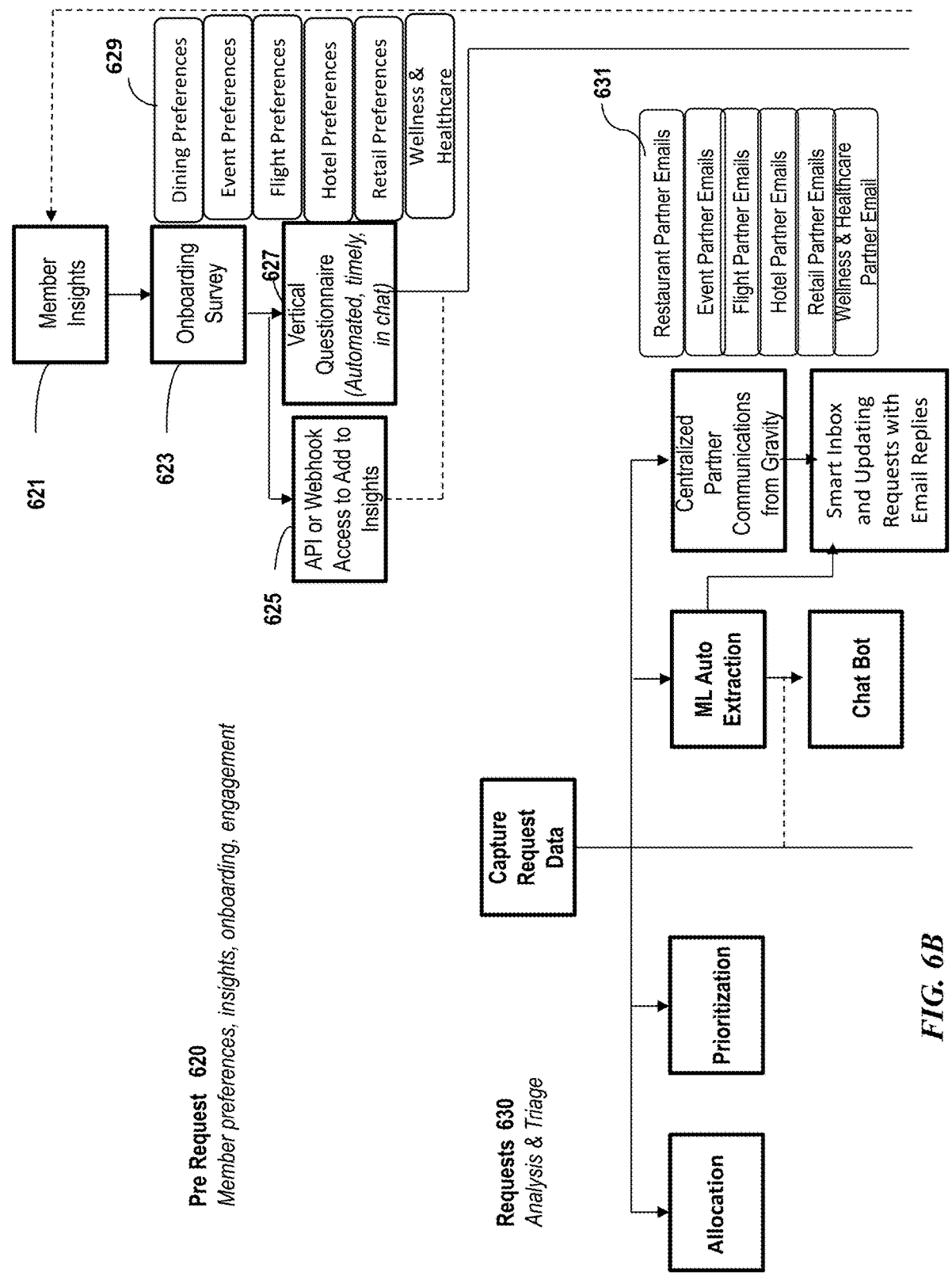
FIGS. 6B-6C show an exemplary process in various stages.
Figure 6C:
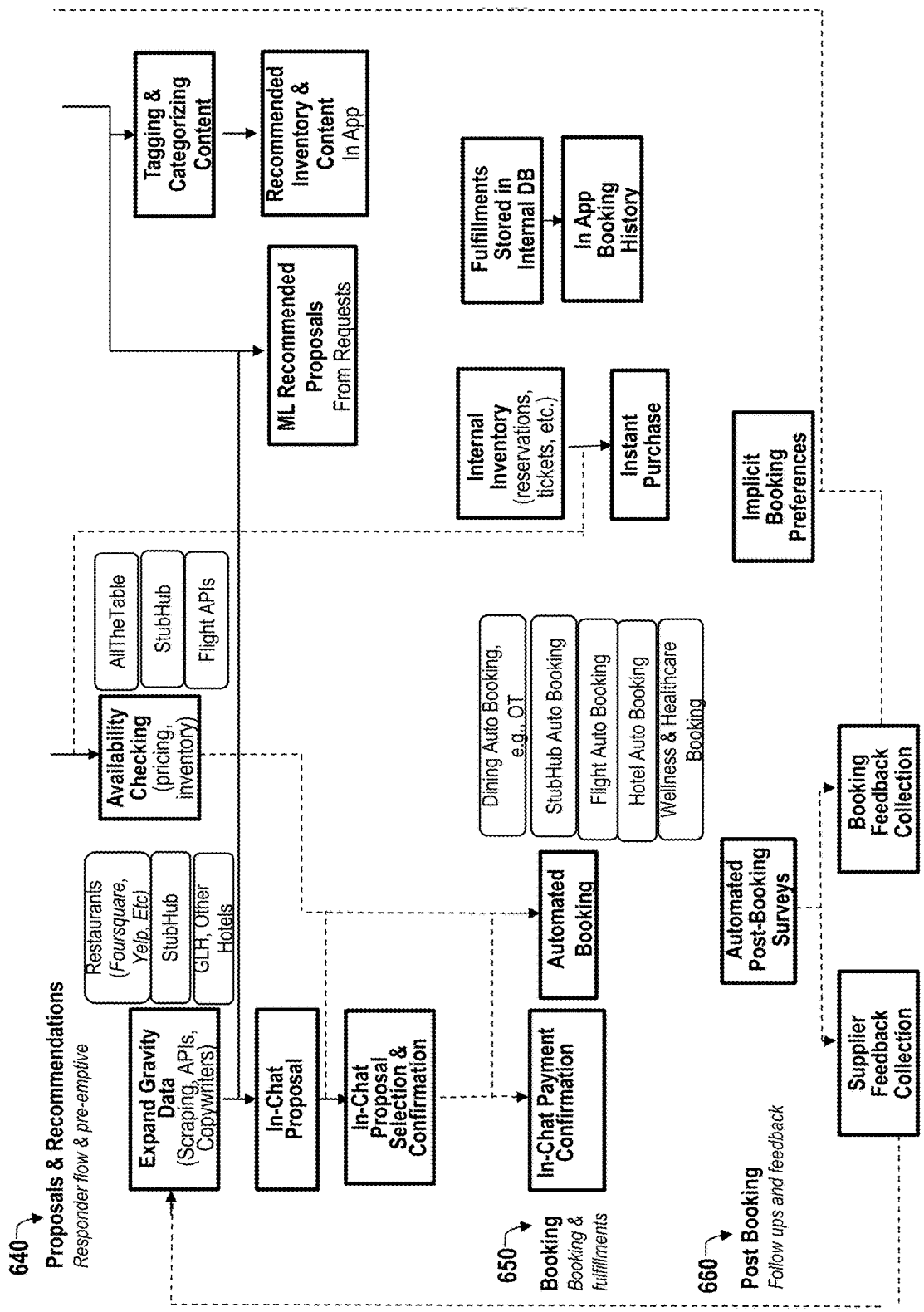

FIGS. 6B and 6C shows an exemplary process 600 including pre-request stage 620, request analysis and triage stage 630, proposal and recommendation stage 640, booking, fulfillment stage 650 and post fulfillment stage 660. In some embodiments, the pre-request stage 620 may include operations to collect data such as customer insights 621, onboarding survey 623, feedback from personalized survey 627, customer preferences related to various services 629

(e.g., hotels and hospitality, restaurants and dining, tourism and entertainment, healthcare, experience, travel, service delivery, and various others). Such data may be aggregated and used for generating training datasets for training one or more machine learning models or for generating recommendations/proposals. Such data may be used for tagging and augmenting the customer database as described elsewhere herein. For instance, the data may be used in the proposal and recommendations stage for generating proposals using the predictive models, tagging and categorizing content and be added to the inventory and content database.

The requests analysis and triage stage 630 can be substantially the same as those described in FIG. 4. For example, the third-party real-time communications and smart inbox may be provided by the plurality of third-party partners 631 (e.g., restaurant partner emails, event partner emails, flight partner emails, hotel partner emails, retail partner emails, wellness & healthcare partner emails, etc.).

The proposals and recommendations stage 640 can be the same as those described in FIG. 5 and the booking and fulfillment stage 650 can be the same as those described in FIG. 6A. for example, the booking stage may include automated booking enabled by the API integration with the plurality of third-party applications. The post booking stage 660 may include operations such as generating and providing automated post-booking surveys, collecting supplier feedback and customer feedback, and processing the post booking data to extract implicit booking preferences (e.g., customer preference, insight, supplier preference and availability, etc.).

Although FIG. 3-FIG. 6C show processes and methods in accordance with some embodiments a person of ordinary skill in the art will recognize that there are many adaptations for various embodiments. For example, the operations can be performed in any order. Some of the operations may be precluded, some of the operations may be performed concurrently in one step, some of the operations repeated, and some of the operations may comprise sub-steps of other operations. For instance, any of the steps can be repeated any number of times until a proposal is accepted by a customer. The method may also be modified in accordance with other aspects of the disclosure as provided herein.

Example of User Interface

Figure 7:
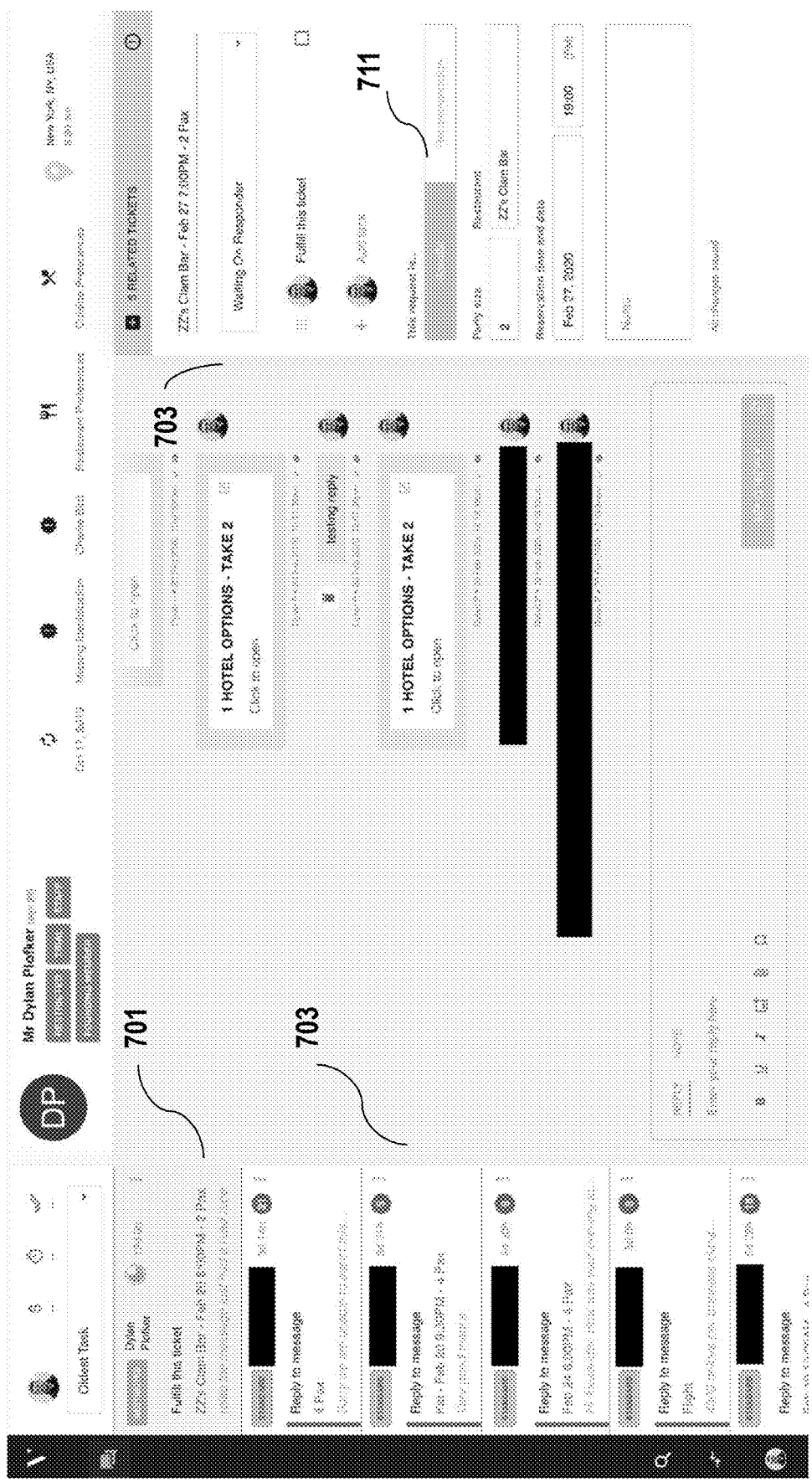

FIGS. 7-13 show various examples of agent responder user interfaces provided by the agent responder system. FIG. 7 shows an example of a user interface for an agent. The user interface shows a user profile 701 registered with the agent responder system and request management panel 703. The request management panel 703 may display one or more messages pinned to a ticket. The user profile may comprise user information such as the agent's user name, user ID, contact information and various others. The illustrated user interface may include request management panel including requests status (e.g., completed requests, open tickets, etc.), requests assigned to the agent, and preview of a request 711. In some cases, the preview of a request 711 may be automatically generated by a machine learning algorithm trained model of the system (e.g., request extractor). An agent (i.e., user) may be permitted to create a new account, provide agent information (e.g., specialties, expertise, availability, etc.) via the user interface. Additionally, the user may set up notifications within the user interface or other user interfaces provided by the system. The user may select a notification delivery method (e.g., email, Slack, SMS), notification triggering events (e.g., a new request, status change of a request, etc.).

Figure 8:
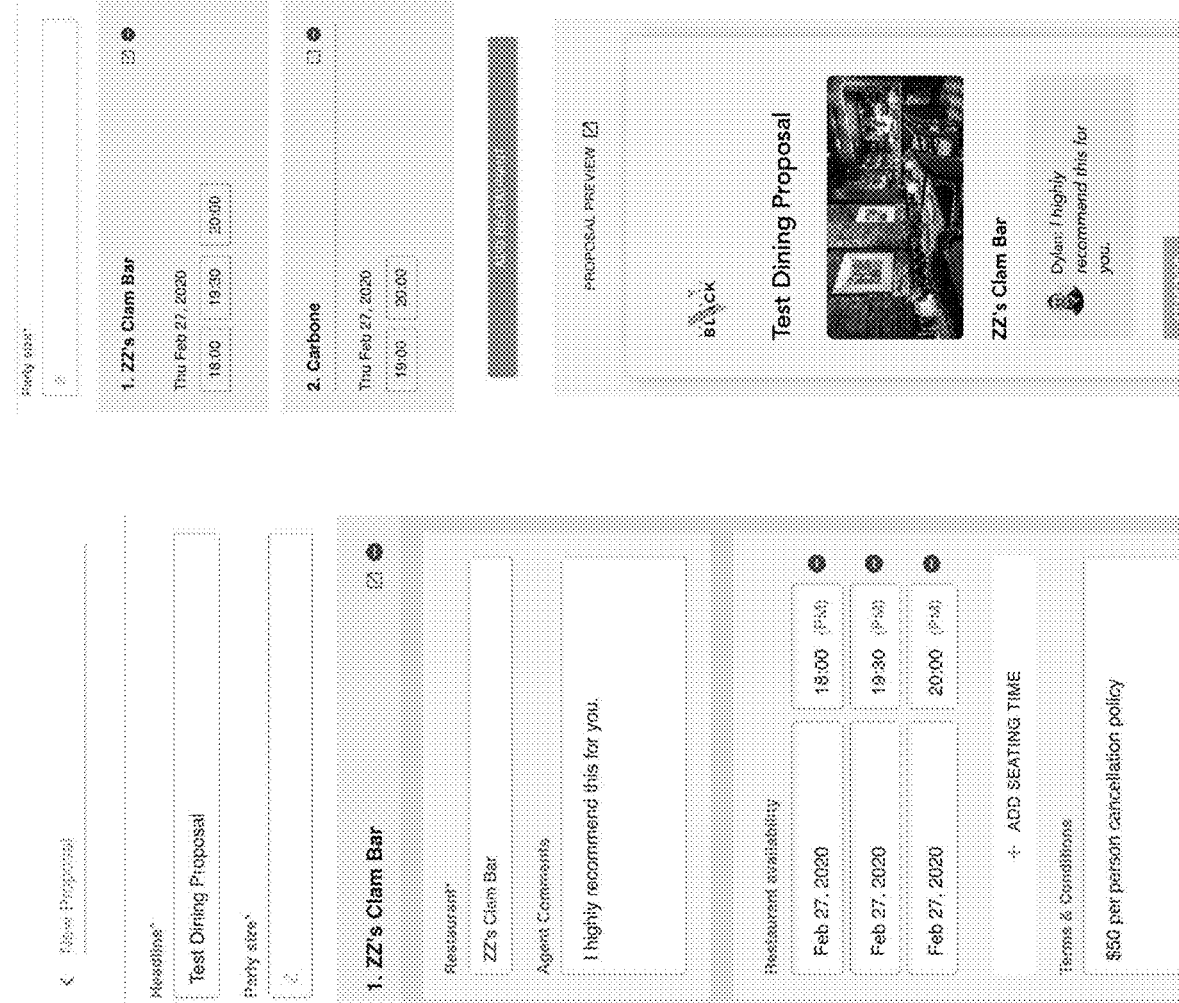
Figure 9A:
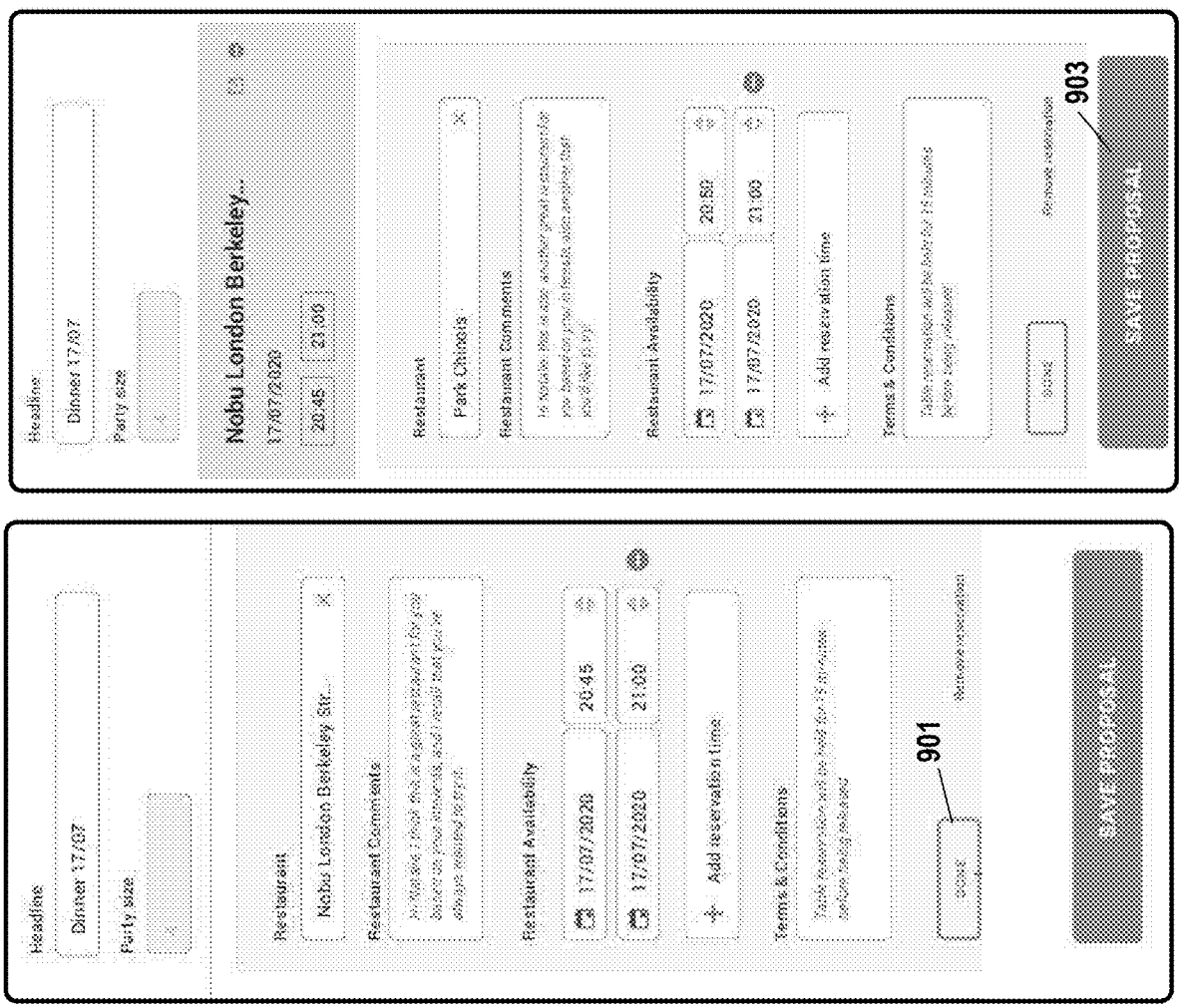
Figure 9B:
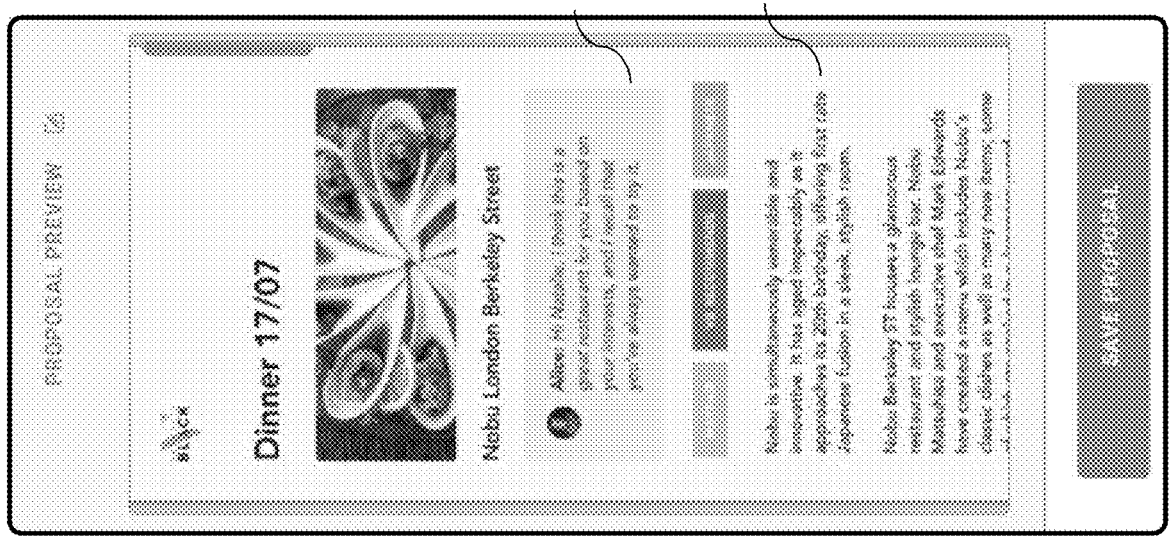
Figure 9B:
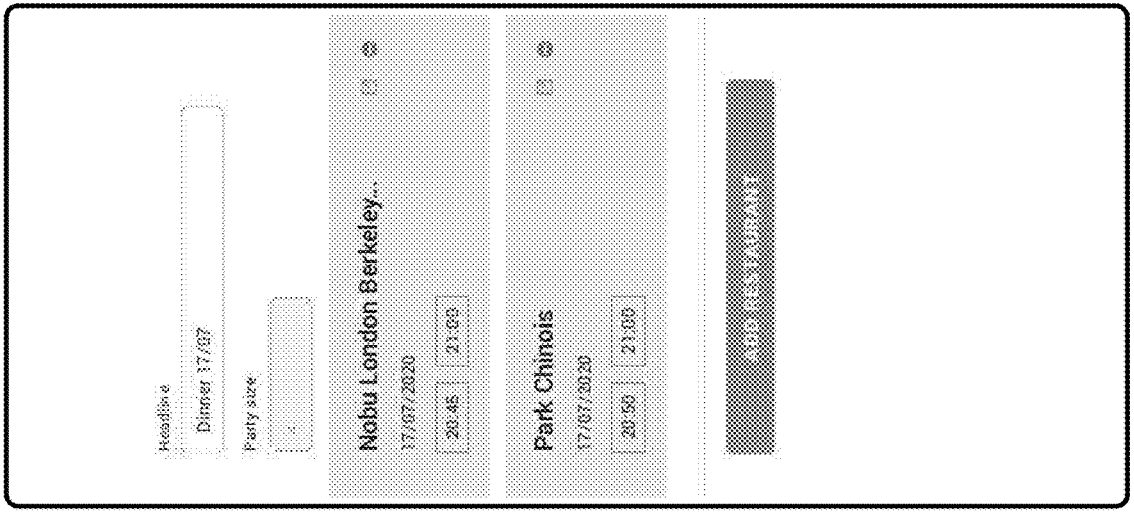

FIG. 8-FIG. 9B show a user interface for generating an example of dining proposal. The illustrated user interfaces may display one or more recommended proposals generated by the system. The graphical user interface may display a plurality of editable fields of one or more recommended dining proposals (e.g., ZZ's Clam Bar, Carbone). For example, as shown in FIG. 8, a user may be permitted to modify the headline of the proposal, agent comments, date/time of the dining request and the like. The user may be permitted to edit one or more fields of the recommended proposal by direct texts input, through a menu or various other input methods. In some cases, the graphical user interface may also display a preview of a recommended proposal. In some cases, the preview may be dynamically updated as the user modify the proposal.

FIG. 9A and FIG. 9B show examples of graphical user interface of a user editing and generating a dining proposal in a streamline. In some cases, the user may be guided to customize a recommended proposal in an optimized workflow. For example, once a user provides put indicating completion of a field or a group of fields such as by clicking the button "Done" 901, or "save proposal" 903, the user may be prompted to continue with the next section or steps. In some cases, one or more of the fields may be filled based on extracted request data points from customer request that may not be editable (e.g., party size). As described above, the proposal may include insight 905, 907 personalized for the customer and agent comments tailored to the customer.

Figure 10:
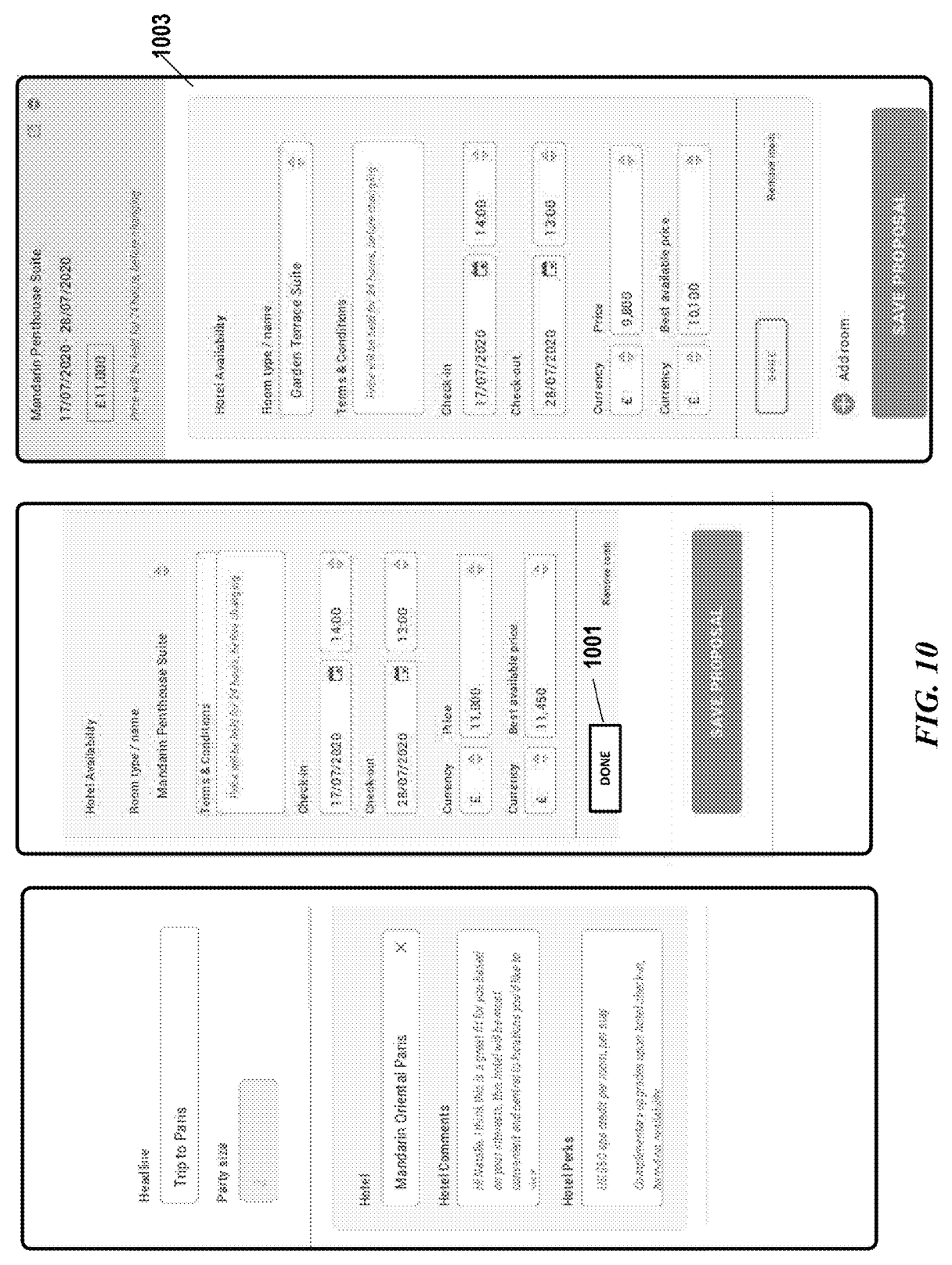

FIG. 10 and FIG. 11 show examples of graphic user interface for a user to edit and generate a hotel proposal. Similarly, the graphical user interface may display one or more recommended hotel proposals generated by the system. The graphical user interface may display a plurality of editable fields of one or more recommended hotel proposals. For example, as shown in FIG. 10, a user may be permitted to modify the headline of the proposal, room type, price, check-in/out date/time and various others. The user may be permitted to edit one or more fields of the recommended proposal by direct texts input, through a menu or various other input methods. In some cases, the graphical user interface may also display a preview of a recommended proposal. The preview may be dynamically updated as the user modify the proposal. Similarly, the process may be streamlined and the user may be guided through the process in an optimized order. For example, once the user clicks on the "done" 1001 button, the user may be directed to a subsequent interface 1003 with options or fields to further customize the proposal.

Figure 12:
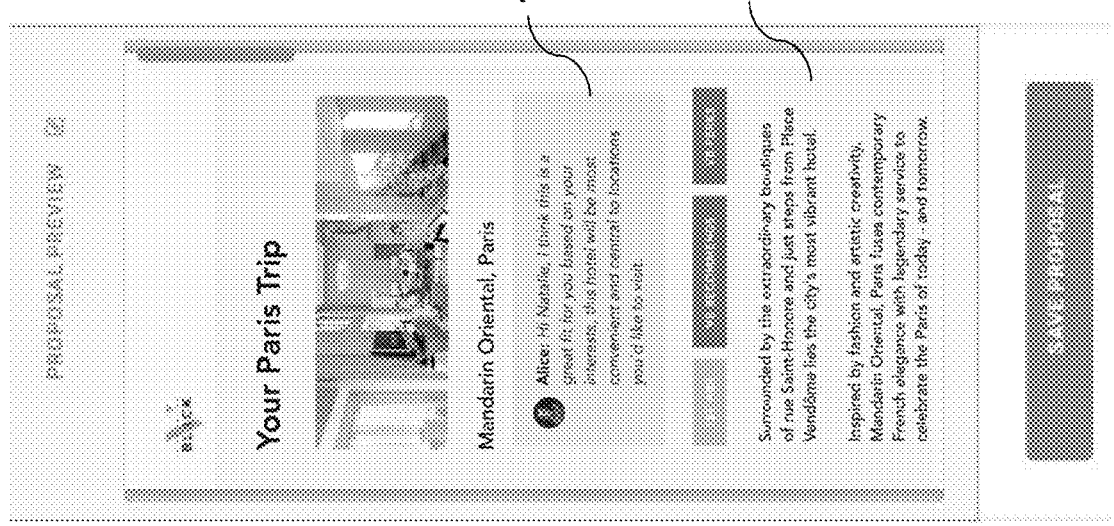

FIG. 11 shows an example that a user is permitted to add another proposal (e.g., by clicking "Add Hotel" 1101) via the graphical user interface. FIG. 12 shows examples of a preview of the proposal generated during the process. For example, a preview of the current proposal may be displayed within the same interface or a user may be permitted to switch between a preview interface and an editing interface. As described above, the proposal may include insight 1203 personalized for the customer and agent comments tailored to the customer 1201.

Figure 13:
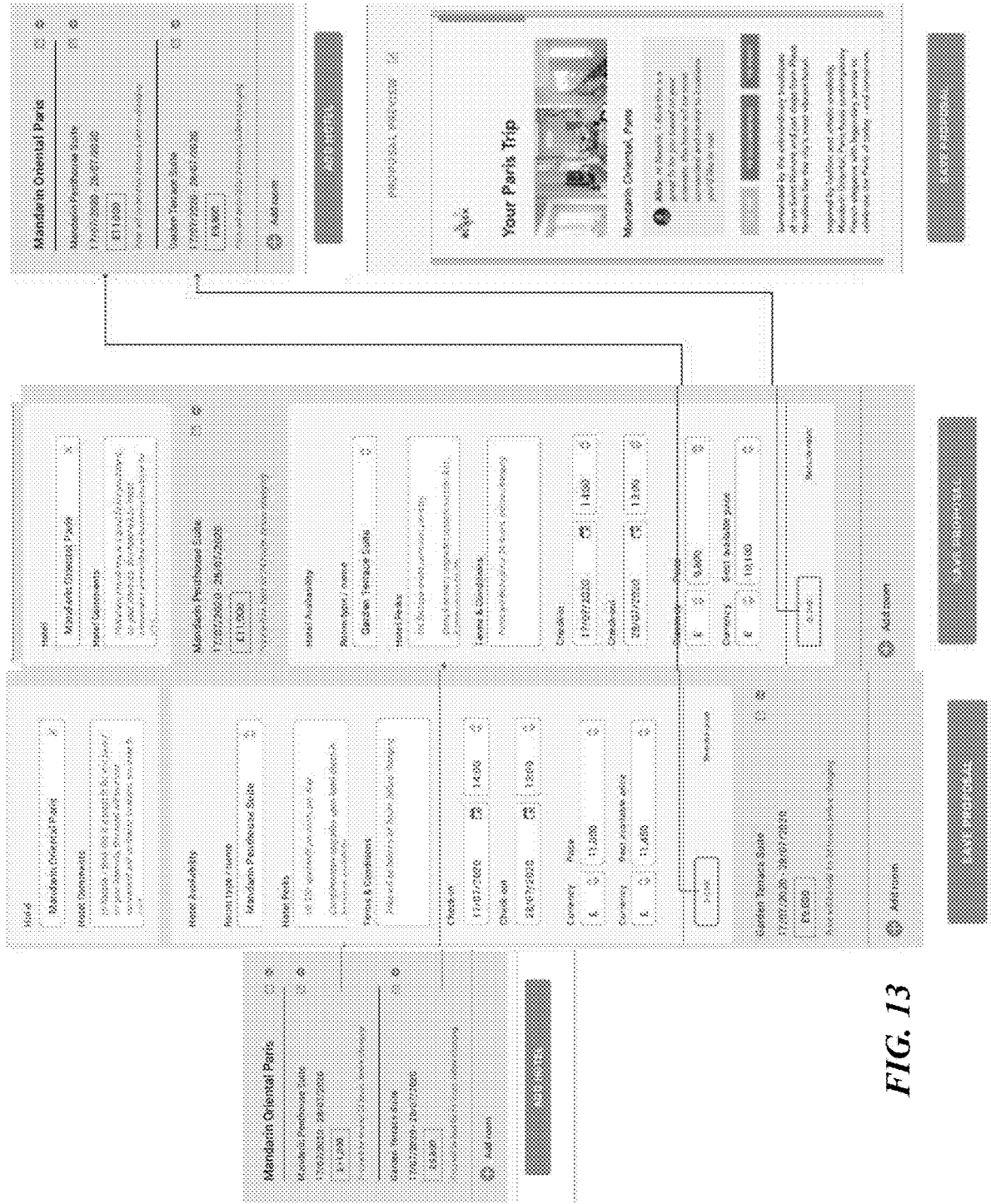

FIG. 13 shows examples of graphical user interface of a user editing and generating a hotel proposal. In some cases, the user may be guided to edit and customize a recommended proposal. For example, once a user provides put indicating completion of a field or a group of fields (e.g., by clicking "Done", "save proposal"), the user may be prompted to continue with the next section or steps. In some cases, one or more of the fields may be filled by the system that may not be editable (e.g., terms and policy).

Figure 14A:
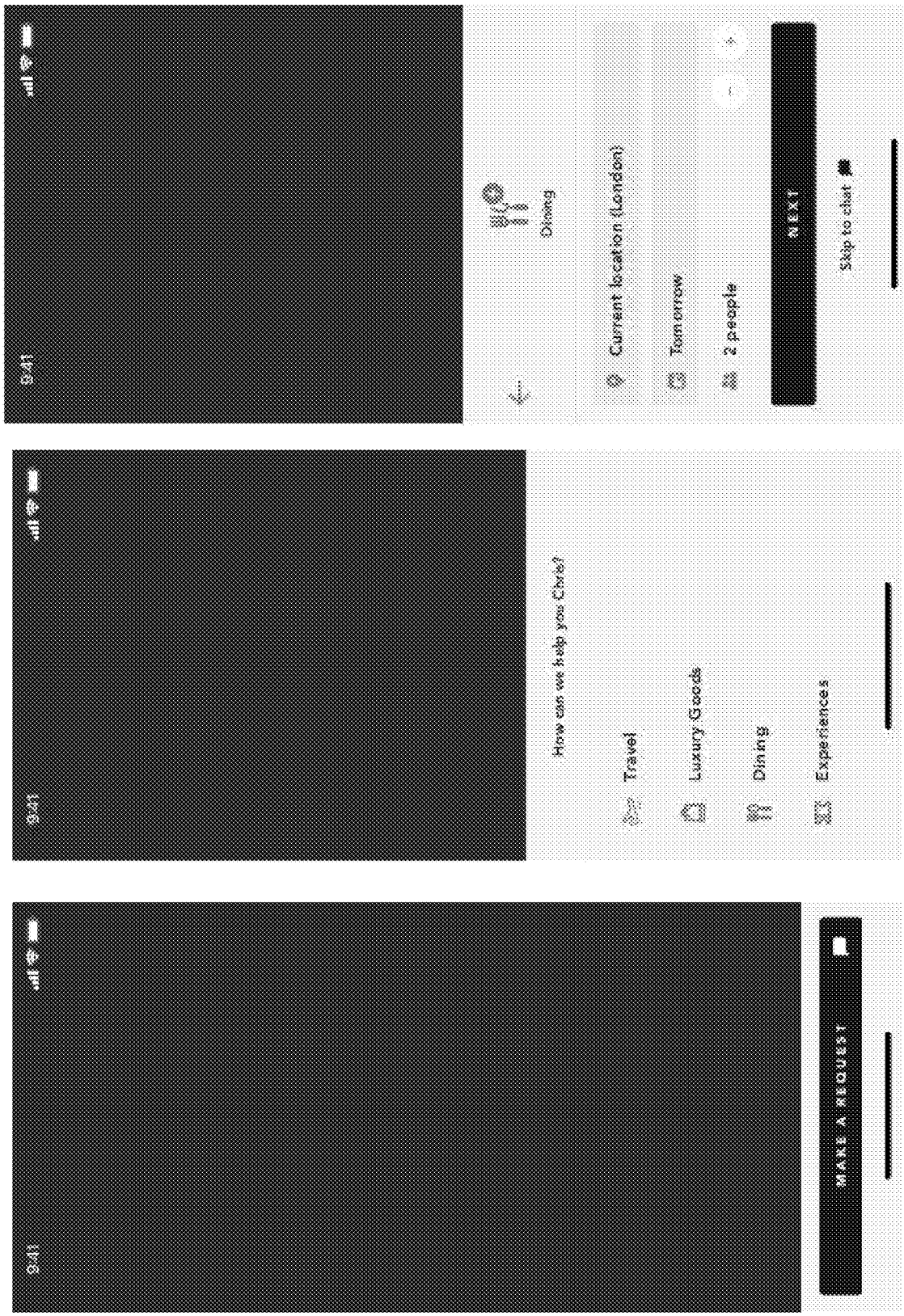
Figure 14B:
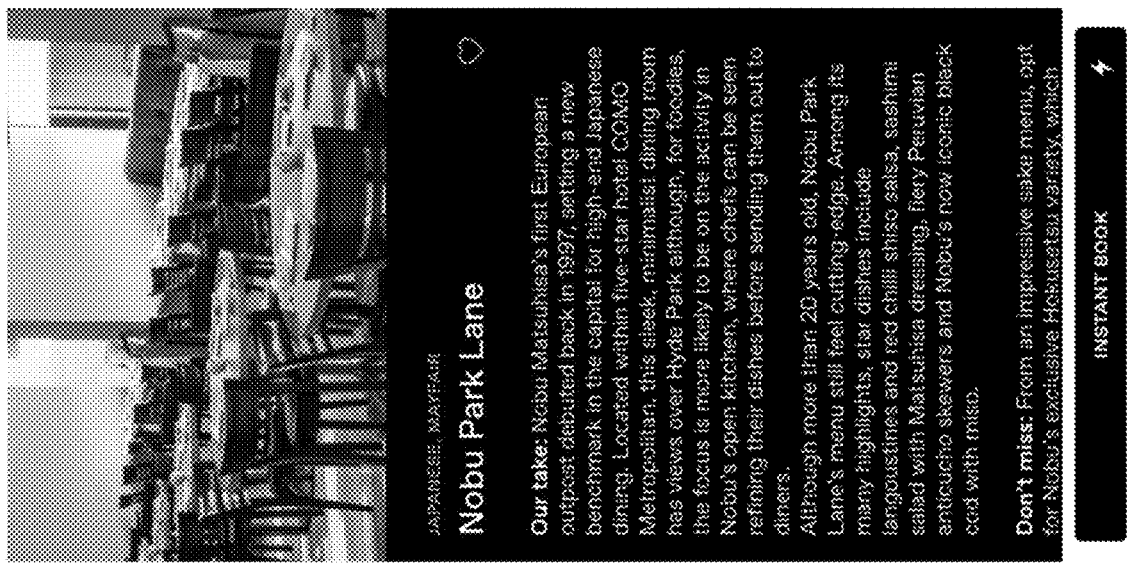
Figure 14B:
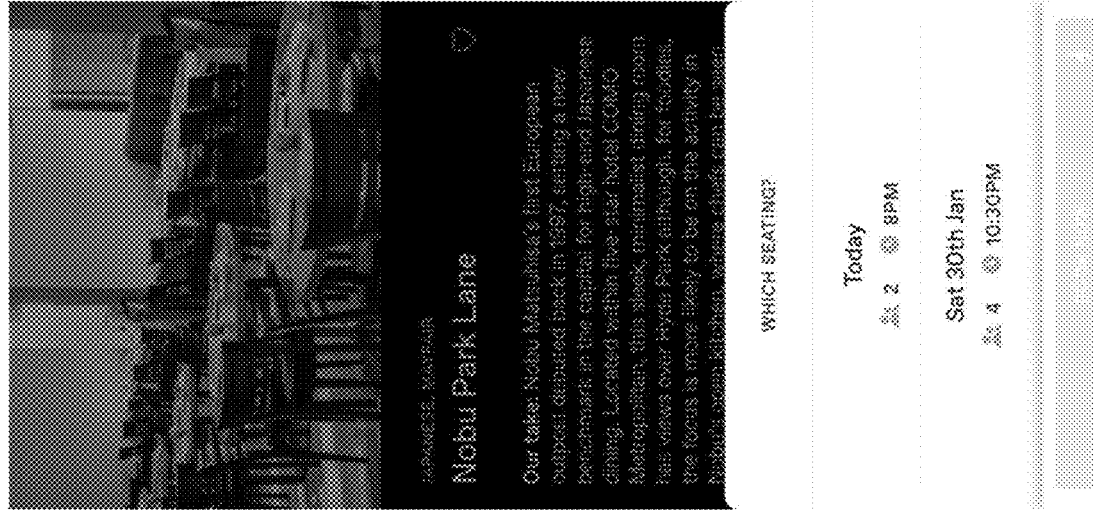
Figure 15:
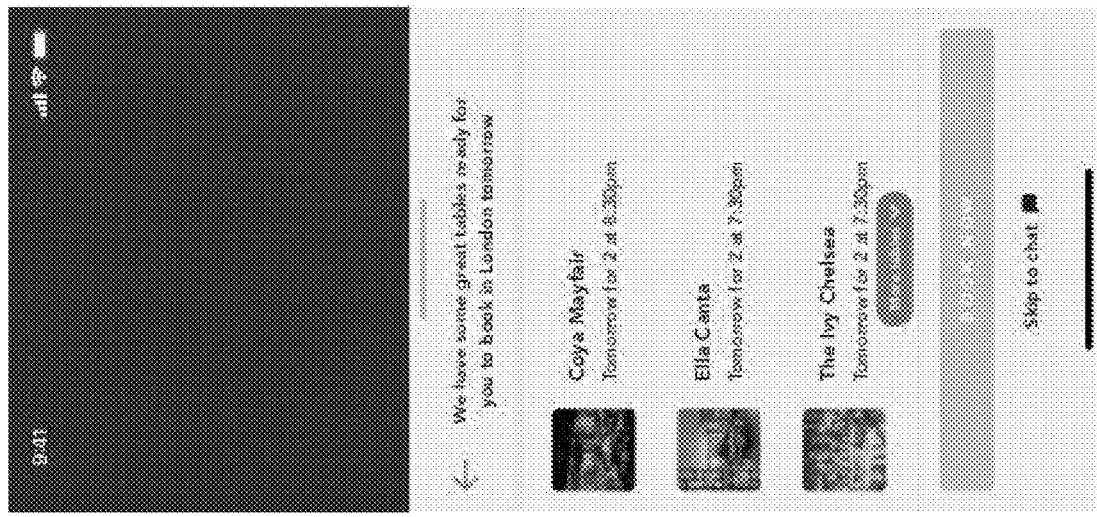

FIG. 14-FIG. 16 show examples of customer user interfaces. FIG. 14 shows example of graphical user interfaces allowing a customer to provide simple input for requesting a service. FIG. 14B shows an example of graphical user interface for a customer to make a reservation instantly. FIG. 15 shows a graphical user interface displaying proposals to a customer. The proposals are generated using the methods as described above. FIG. 16A shows an example of graphical user interface for a customer to perform instant in-app chatting with an agent.

In some cases, the customer user interface may provide voice interface for the customer to make request or instant book inventory. The voice interface may receive voice command or input from a customer and may be capable of performing simple or instance booking (e.g., instant-book dining reservations), as well as sending the custom requests to the agent responder system.

Figure 16A:
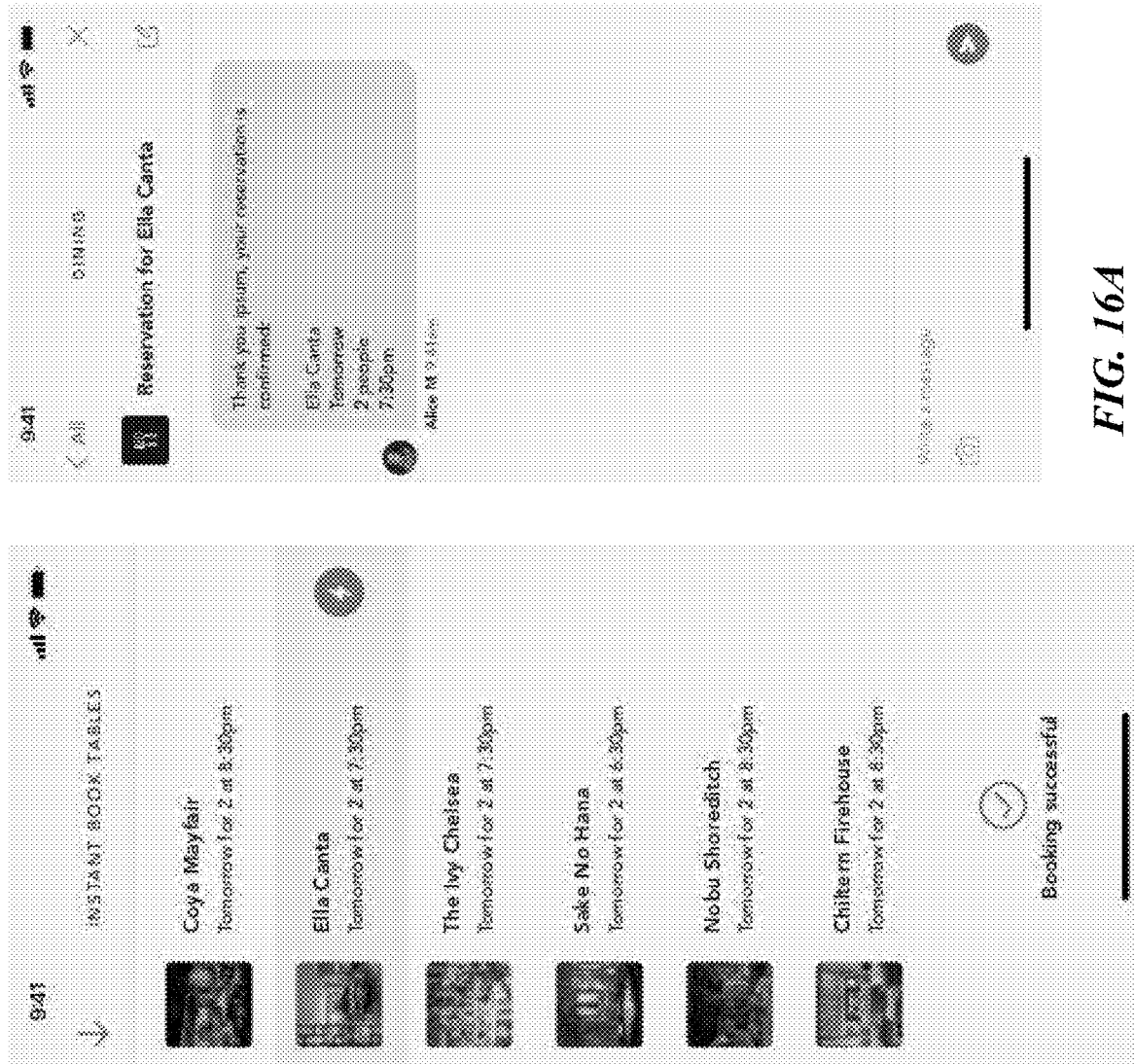
Figure 16B:
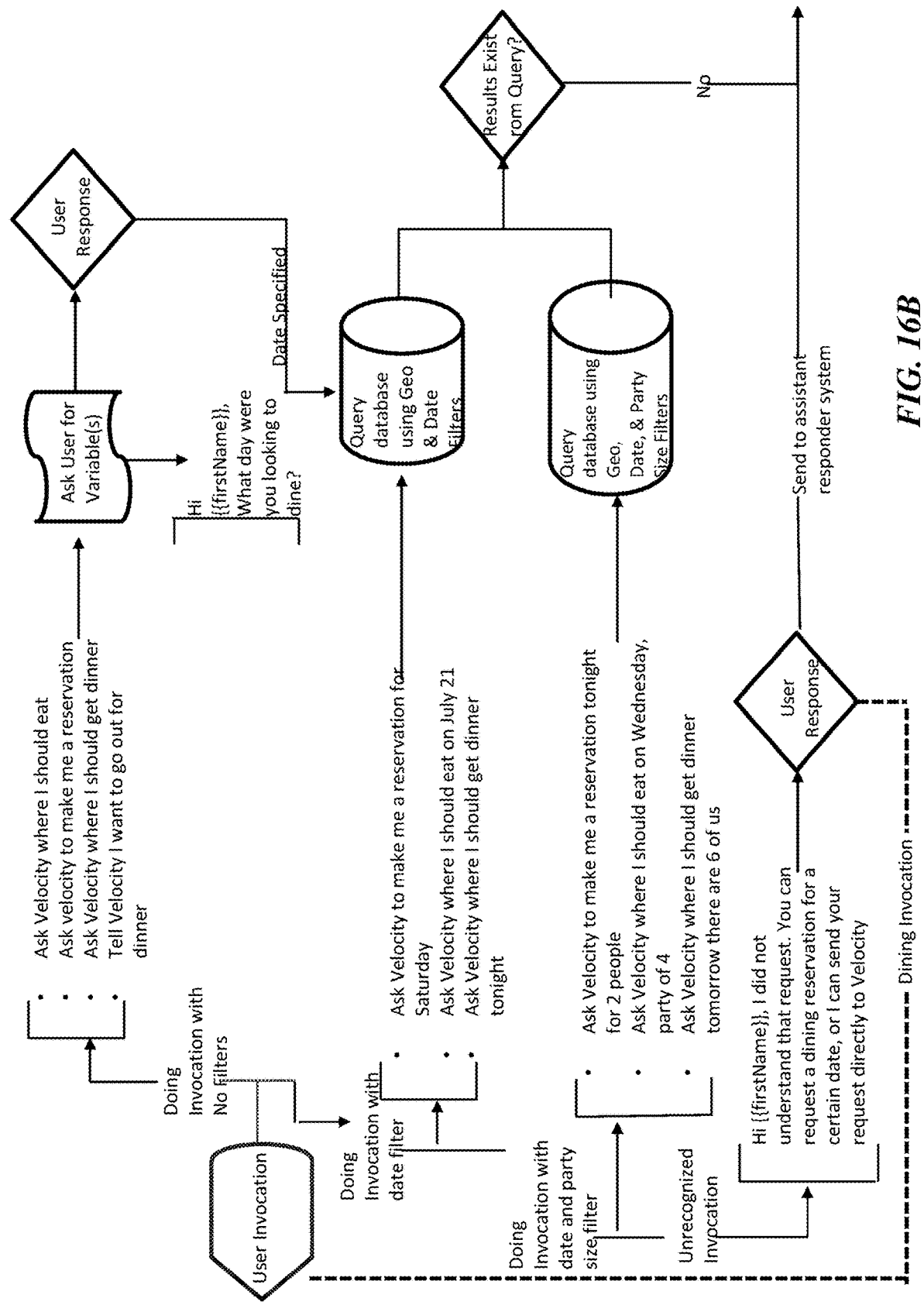
FIGS. 16B-D shows an exemplary process of making a reservation via the customer user interface.
Figure 16C:
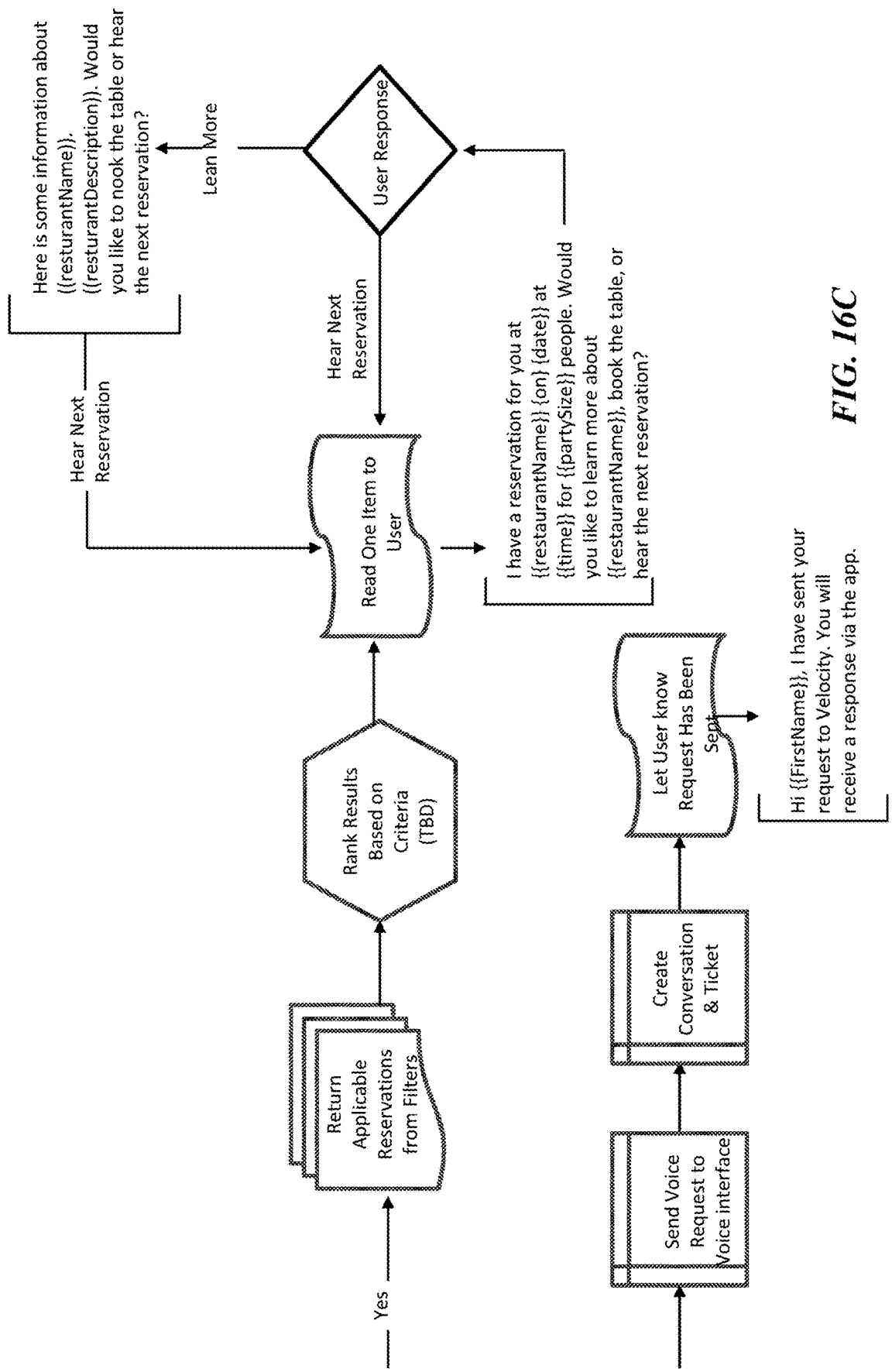
Figure 16D:
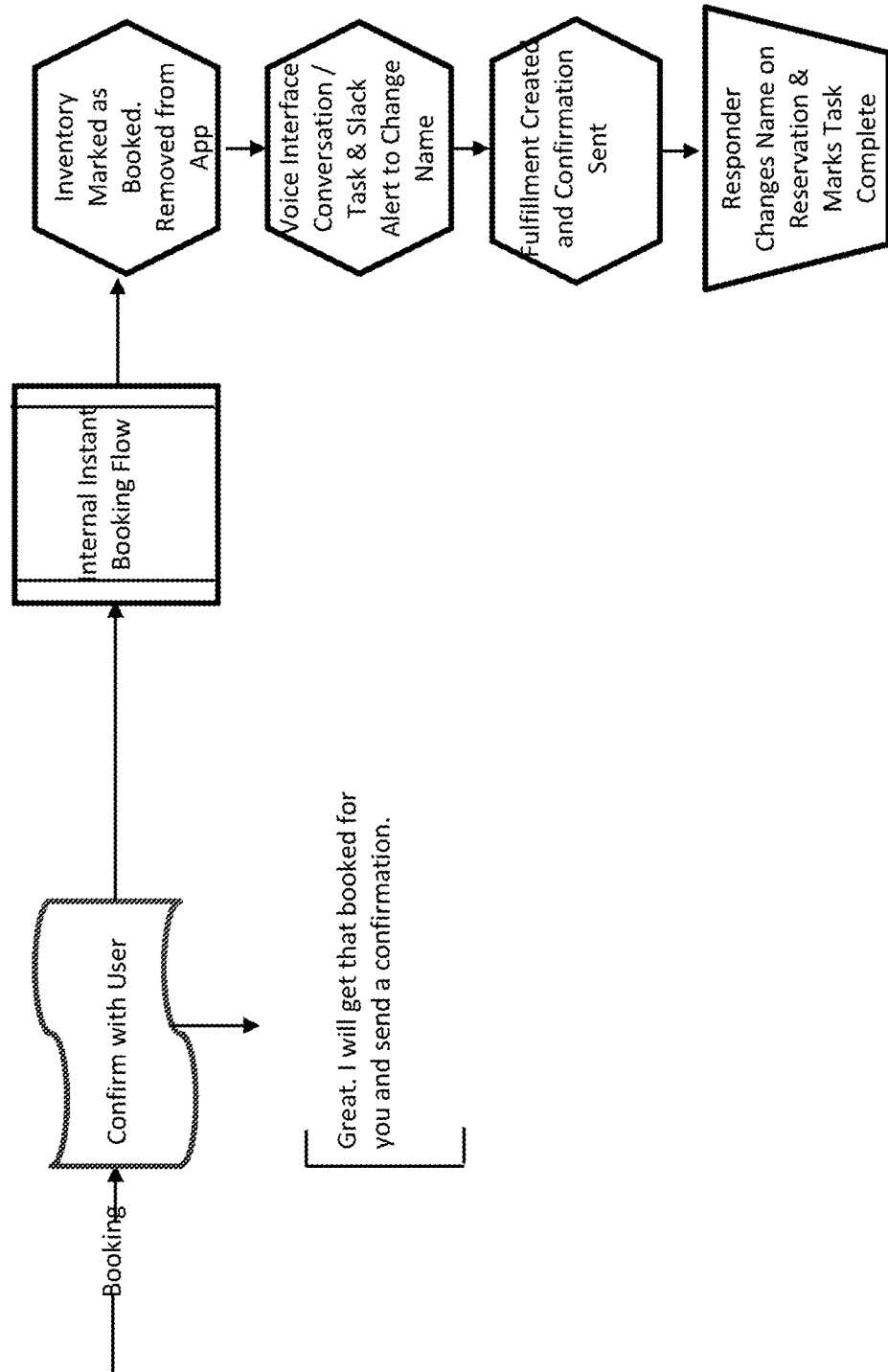

FIGS. 16B-D shows an example of process for making a reservation through the voice interface. To start an instant-book dining request, a customer may provide voice command to the voice interface (e.g., voice-controlled digital assistant) to book a reservation on a specific date in a city, and/or specify a party size (e.g., Can you please book me a dinner reservation for tonight in Dubai for 2 people? Can you make me a booking on Saturday in New York? I need to find somewhere to eat tomorrow in Los Angeles). The voice interface may be able to utilize the last known location as the city for the request or based on location data from location services enabled in the application. In some cases, the voice interface may send a custom request to the agent responder system automatically. In some cases, the customer may request or confirm to send the request to an agent. The customer may be asked to confirm the instant booking through voice interface. Upon the confirmation, the inventory item may be automatically marked as Booked in the reservation system, and no longer available for other requests. A ticket may be created automatically. In some cases, a conversion may also be created which includes a transcript of the voice conversation, extracted insights from the conversation, captured request data and/or a link for the reservation. Subsequently, a fulfillment may be automatically created and the ticket status may be updated to fulfilled in the system.

In another example, when a user started the dining reservation request flow, but decided to send their request to the responder agent system instead of booking a table instantly, or if no tables were available, a new conversation with a dining ticket may be created. The conversation may include, for example, the full transcript of the voice conversation attached in notes. A new ticket for the request may be created, for the particular ticket type or division based on the captured request data. The new ticket and conversation are processed in the workflow as shown in FIG. 16B.

Figure 17:
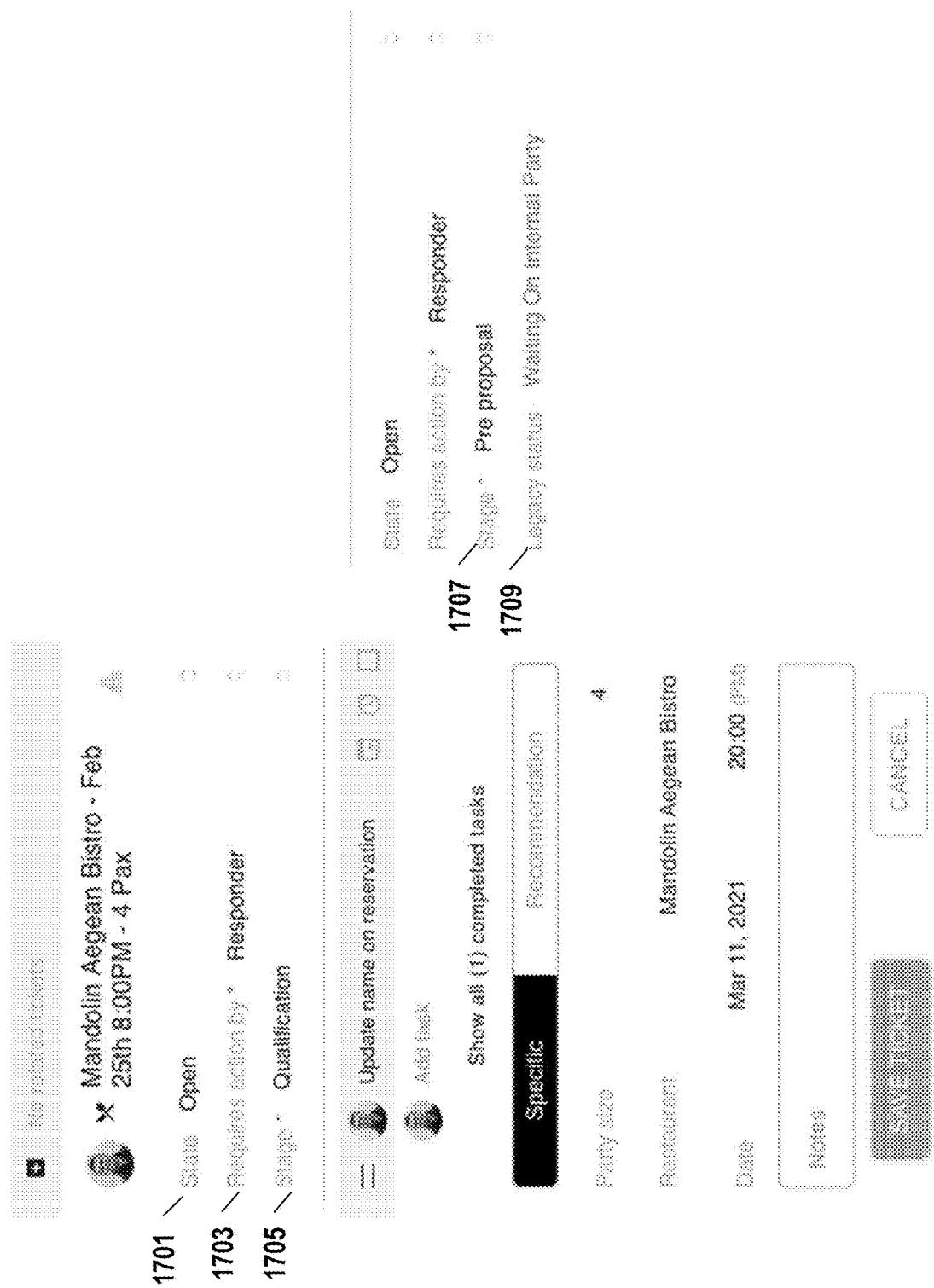

The agent responder system may also provide agent responder user interfaces presenting information about tasks associated with an agent. FIG. 17 shows examples of agent responder user interfaces including one or more ticket fields. The one or more ticket fields may include a state field 1701, a "requires action by" field 1703, a stage field 1705, or a legacy status field 1709. The State field 1701 may show a state of a ticket such as Open, Fulfilled, Unfulfilled, or Closed. The Requires action by field 1703 may display information about who requires this ticket such as Responder, Member/customer, or Supplier. The Stage field 1705, 1707 may display information about different stages in a sales pipeline such as pre proposal, or qualification. The legacy status field 1709 may show the current legacy of the ticket such as waiting on internal party.

Figure 18:
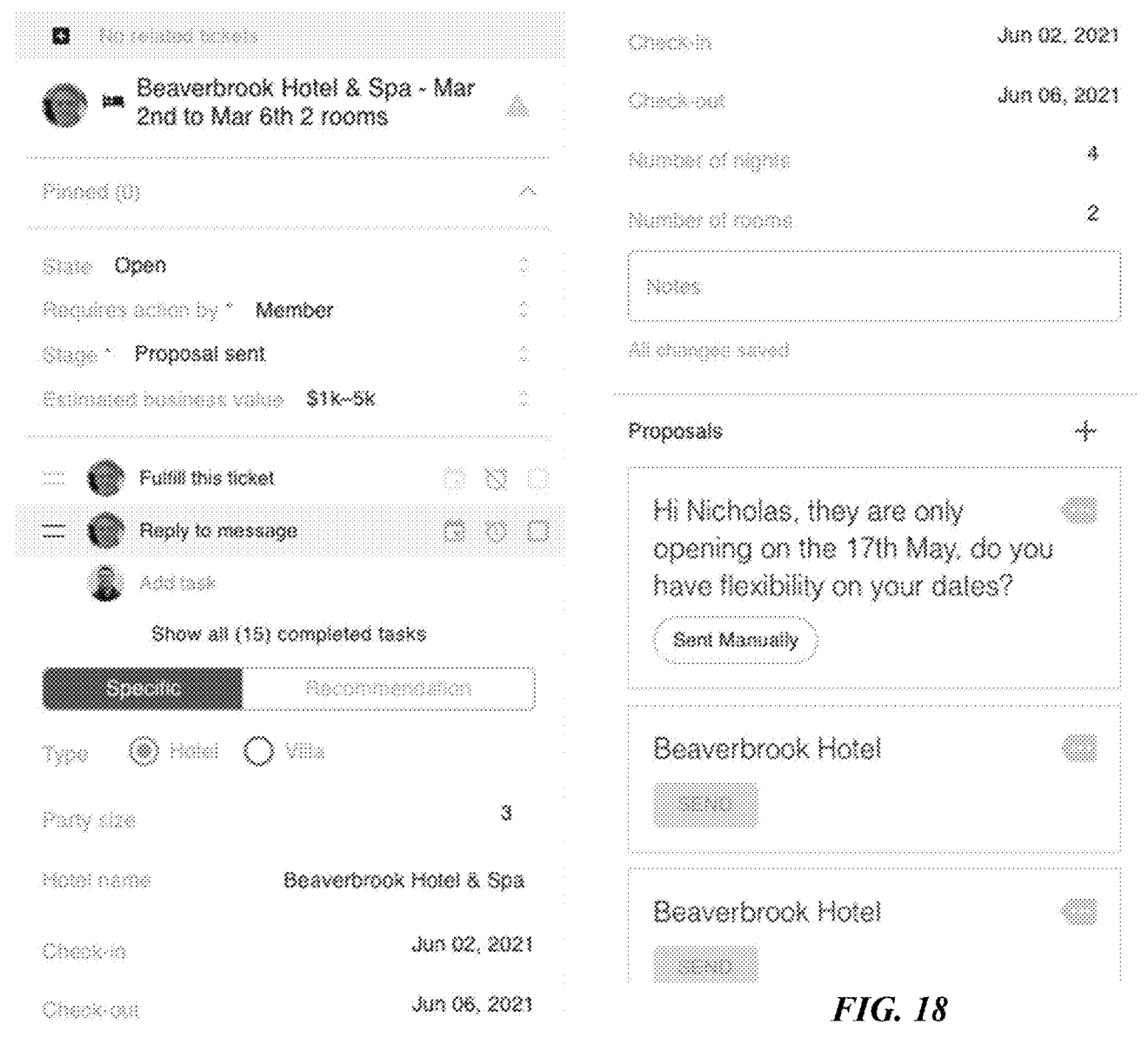

FIG. 18 shows examples of user interfaces for an agent to manage all the tickets associated with the agent. For example, the agent may view the status of a ticket (e.g., State, Requires action by, Stage, Estimated business value), view and manage completed tasks, review or edit a proposal. The agent may be permitted to view the completed tasks based on a selected type (e.g., Hotel, Villa) of the tasks, or recommendation.

Figure 19:
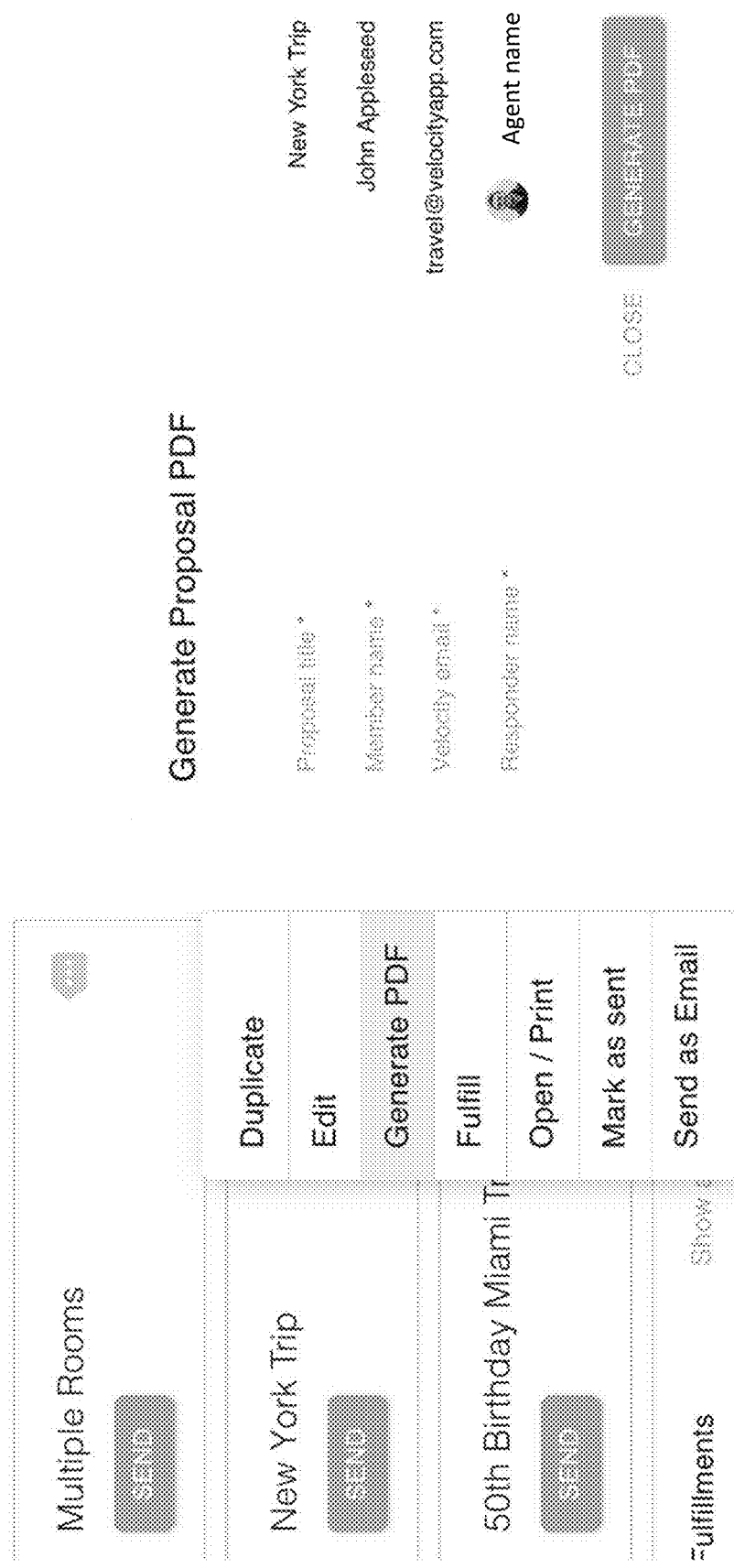

The agent responder system may allow an agent to generate the proposal in various forms. For example, the system may provide PDF generation function such that an agent may output the proposal and deliver it in PDF document. FIG. 19 shows an example of responder agent user interface allowing agents to generate a proposal in PDF format.

Figure 20:
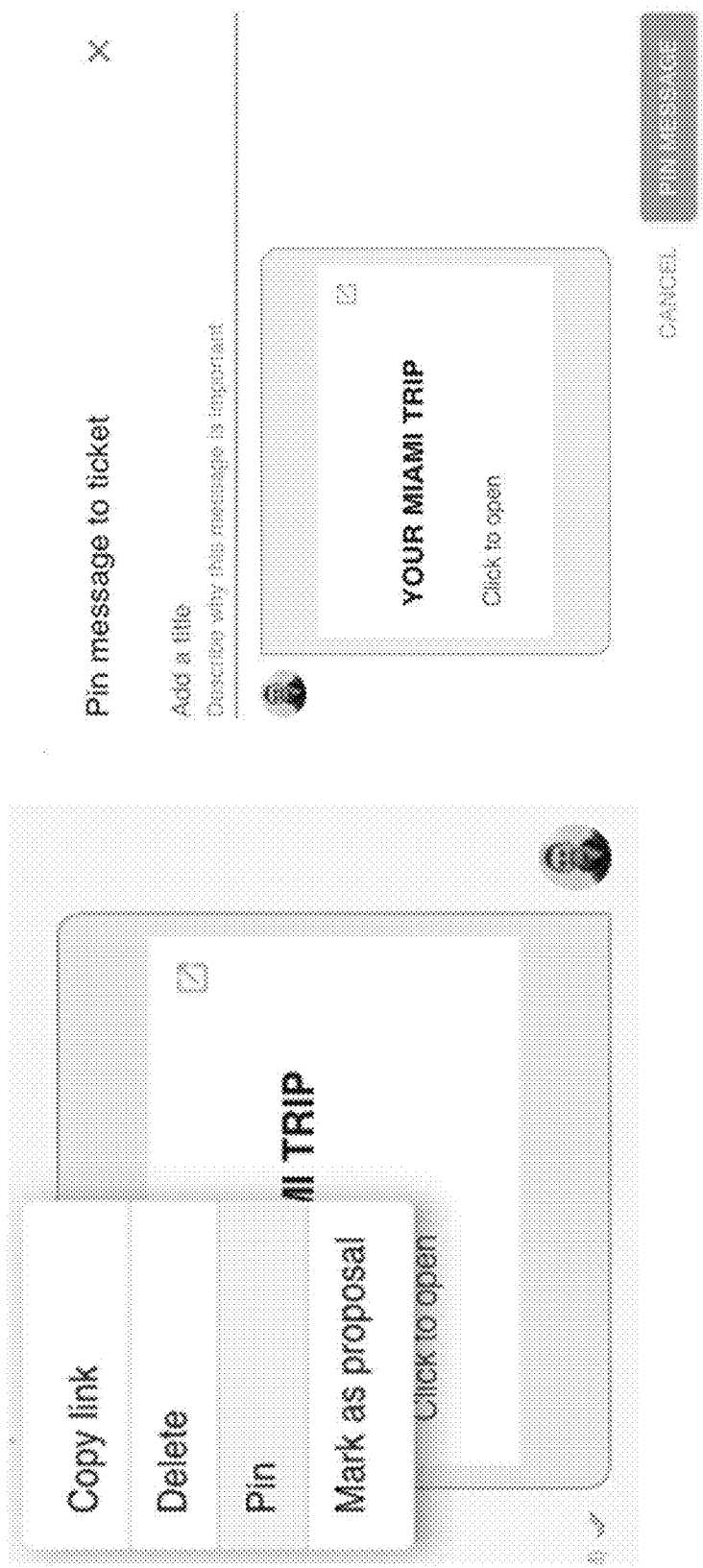

The agent responder system may permit agents to pin one or more messages to a ticket or task. Agents or users of the agent responder system may communicate information and transmit messages (e.g., comments, proposals, user messages) by pinning the one or more messages to a ticket. A message may be generated and pinned to a ticket manually or automatically. FIG. 20 shows examples of responder agent user interface for pinning message. As shown in the example, a user may pin a message (e.g., comments, proposals, user messages) by selecting "Pin" and adding a title about the message. Alternatively, the title of the message may be automatically filled in by the system with default information. In some cases, certain types of messages such as fulfillment steps, confirmation messages may be set to be pinned automatically. Users of the system may configure the automated pinning settings to determine which types of messages to be pinned automatically.

The agent responder system may automatically generate one or more tasks for a ticket (request). The one or more tasks may be helpful for managing and optimizing a workflow for user. For example, upon creation of a new ticket, a task "Send proposal" may be automatically added to the ticket. In some cases, a deadline may be set for the one or more tasks. For example, a deadline for the task "Send proposal" may be the maximum acceptable time for sending the proposal for a ticket. The deadline for a task such as the send proposal may be determined automatically by the system based on the ticket (request) type, subtype, and various other factors.

Figure 21:
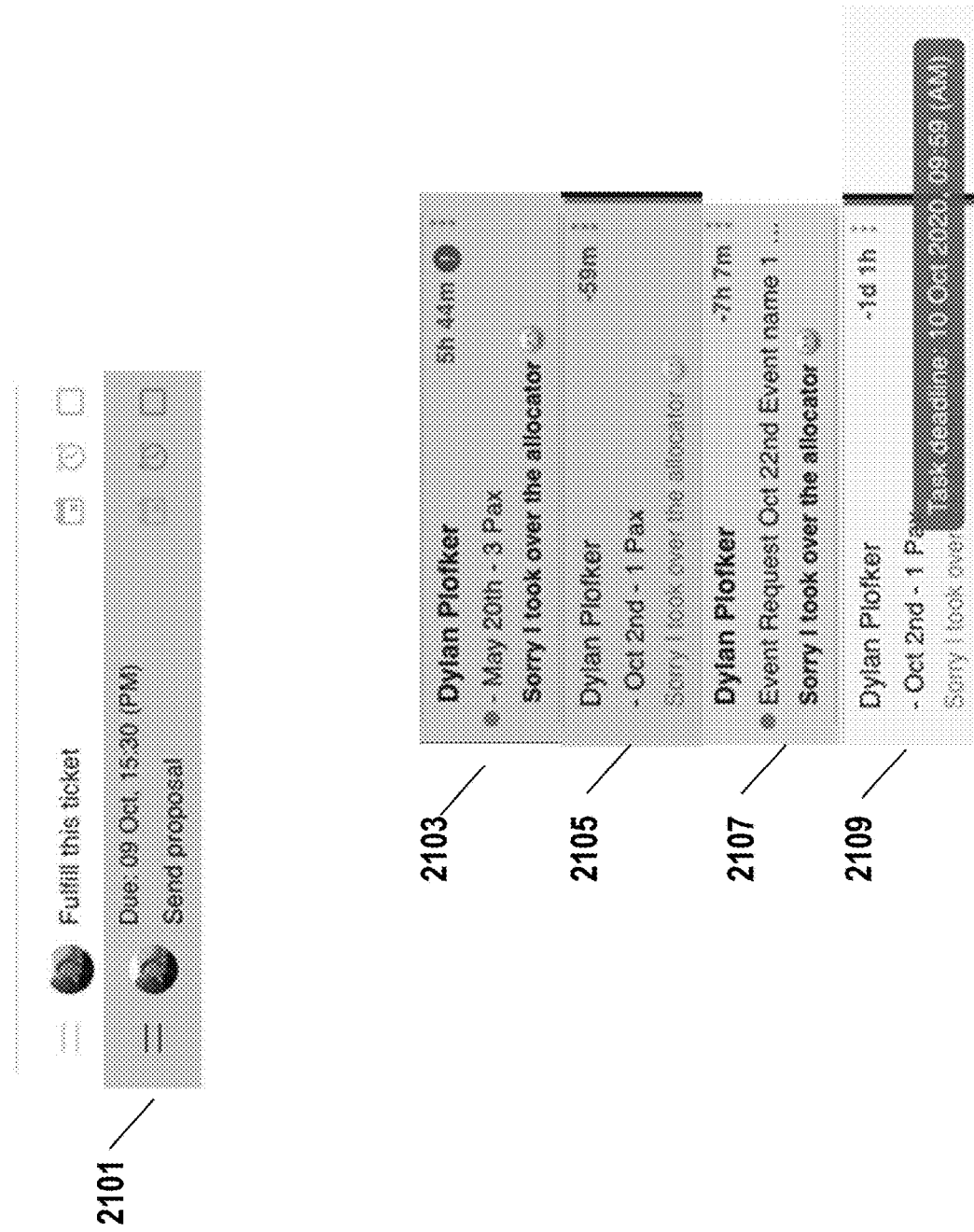

FIG. 21 shows examples of tasks associated with tickets and managing the tickets based on the tasks and deadlines assigned to the tasks. In the example 2101, a proposal tasks associated with a ticket may be marked as completed by the system upon the task "send proposal" is completed. A queue of tasks may be displayed with indicators showing priority of the tasks based on the deadlines. For instance, the tasks may be color-coded to indicate imminent deadlines, overdue and the like. In the illustrated example, tasks that are overdue 2103 may be highlighted in 'red' color and displayed with a warning icon, tasks that are due within 1 hour may be highlighted in 'red' 2105, tasks that are due within the next 24 hours may be highlighted in 'orange' color 2107 and tasks that are not due within 24 hours may not be highlighted 2109 (e.g., in 'white' color). The hours until (or hours passed since) the deadline are also displayed with the items in the queue. This beneficially allows for automatically optimizing the order of the tasks for a user.

Figure 22:
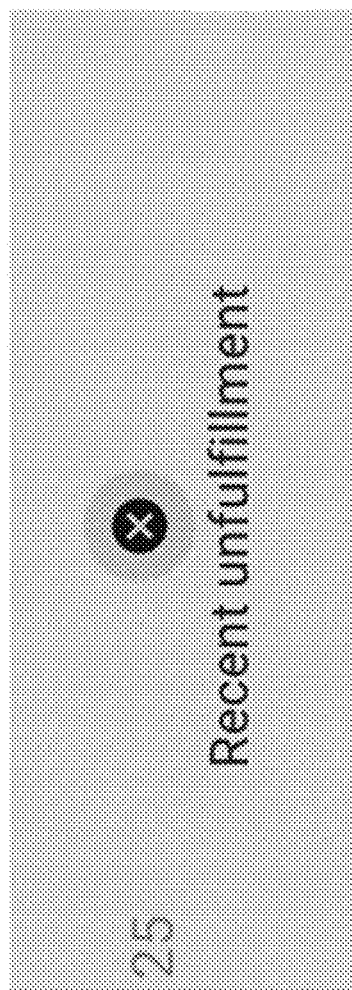

The agent responder system may further provide a Heads Up Display (HUD) feature to agent responder user interface. The HUD function may highlight important events to an agent based on a ranking algorithm. The important events may be, for example, disengaged member (e.g., customers who have not requested for more than two months), recent unfulfillments, recent incidents (e.g., member aware incident in last request or 3 or more in the past 30 days), ongoing incident (e.g., ongoing incidents in one or more of a member's requests), and the like. FIG. 22 shows an example of HUD feature. The important events may be highlighted in orange color and displayed on the top of the user interface to draw the attention to the agent.

The HUD function may highlight important events to an agent based on a ranking algorithm. This may beneficially provide more important and implied information to a user. For example, the ranking algorithm may score the events based on ticket data (e.g., type of ticket), previous ticket and fulfilment data (e.g. most recent fulfillment, recent unfulfillment, recent incident), insights data (e.g. allergies, airline preferences) to determine the relevant and highest scoring events to display to the agent.

As used herein, "or" is inclusive and not exclusive, unless expressly indicated otherwise by context. Therefore, "A or B" means "A, B, or both," unless expressly indicated otherwise or indicated otherwise by context. Moreover, "and" is both joint and several, unless expressly indicated otherwise or indicated otherwise by context.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for reducing processing resources utilized for applying machine learning, the system comprising:
    a server in communication with a plurality of user devices over a network, wherein the server comprises:
    memory, and
    one or more processors configured to cause the system to:
        determine to process a request using a virtual agent that is associated with a training using at least one of a deep neural network, a convolutional neural network (CNN), or recurrent neural network (RNN);
        analyze, based on determining to process the request using the virtual agent, dialog states of a dialog with the virtual agent;
        redirect, based on analyzing the dialog states of the dialog with the virtual agent and based on a virtual agent data structure, the request to a different virtual agent that has undergone continual retraining that is different from the training of the virtual agent and that is based on changes in an implementation environment;
        generate, using a first machine learning algorithm trained model of the different virtual agent and based on redirecting the request to the different virtual agent, one or more proposals based on request data related to a service the request; and
        provide editable fields for modifying one or more fields of the one or more proposals via a first graphical user interface, wherein at least one of the one or more fields includes insight data extracted by processing feedback data received from a second graphical user interface.

2. The system of claim 1, wherein the request data comprises request data points extracted from input for the request.

3. The system of claim 2, wherein the request data points comprise a type of the request, a time, or a location.

4. The system of claim 2, wherein the one or more processors are further configured to match the request with a user, based at least in part on the request data points, for modifying the one or more fields of the one or more proposals.

5. The system of claim 2, wherein the one or more processors are further configured to generate availability information based on inventory data and the request data points.

6. The system of claim 5, wherein the one or more processors are further configured to obtain the inventory data through one or more Application Programming Interface (API) integration points.

7. The system of claim 5, wherein the one or more processors are further configured to generate, based on the availability information and the request data points, input feature data to be processed by the first machine learning algorithm trained model.

8. The system of claim 7, wherein the input feature data comprise insight data extracted from a feedback survey personalized to a customer.

9. The system of claim 8, wherein the one or more processors are further configured to provide, for display, the feedback survey on the second graphical user interface.

10. The system of claim 8, wherein the feedback survey is personalized using a second machine learning algorithm trained model.

11. The system of claim 1, wherein the one or more fields comprise one or more objective fields arranged in a hierarchical structure.

12. The system of claim 1, wherein the one or more processors are further configured to track a fulfillment of the request through an API integration point with a service supplier.

13. The system of claim 12, wherein the feedback data comprises feedback from the service supplier.

14. A computer-implemented method, comprising:
    determining to process a request using a virtual agent that is associated with a training using at least one of a deep neural network, a convolutional neural network (CNN), or recurrent neural network (RNN);
    analyzing, based on determining to process the request using the virtual agent, dialog states of a dialog with the virtual agent;
    redirecting, based on analyzing the dialog states of the dialog with the virtual agent and based on a virtual agent data structure, the request to a different virtual agent that has undergone continual re-training that is different from the training of the virtual agent and that is based on changes in an implementation environment;

generating, using a first machine learning algorithm trained model of the different virtual agent and based on redirecting the request to the different virtual agent, one or more proposals based on request data related to the request; and providing editable fields for modifying one or more fields of the one or more proposals via a first graphical user interface, wherein at least one of the one or more fields includes insight data extracted by processing feedback data received from a second graphical user interface.

15. The computer-implemented method of claim 14, wherein the request data comprises request data points extracted from input for the request.

16. The computer-implemented method of claim 15, wherein the request data points comprise a type of the request, a time, or a location.

17. The computer-implemented method of claim 16, further comprising matching the request with a user, based at least in part on the request data points, for modifying the one or more fields of the one or more proposals.

18. The computer-implemented method of claim 15, further comprising generating availability information based on inventory data and the request data points.

19. The computer-implemented method of claim 18, wherein the inventory data are obtained through one or more API integration points.

20. The computer-implemented method of claim 18, wherein the availability information and the request data points are used to generate input feature data to be processed by the first machine learning algorithm trained model.

* * * * *